US009292235B2

(12) United States Patent  
Oguro

(10) Patent No.: US 9,292,235 B2  
(45) Date of Patent: Mar. 22, 2016

(54) STORAGE MEDIUM AND COMMUNICATION APPARATUS

(71) Applicant: BROTHER KOGYO KABUSHIKI KAISHA, Nagoya-shi, Aichi-ken (JP)

(72) Inventor: Yuki Oguro, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/445,689

(22) Filed: Jul. 29, 2014

(65) Prior Publication Data

US 2015/0036168 A1 Feb. 5, 2015

(30) Foreign Application Priority Data

Jul. 31, 2013 (JP) .................................. 2013-160015

(51) Int. Cl.
 *G06K 15/00* (2006.01)
 *G06F 3/12* (2006.01)
 *H04N 1/00* (2006.01)

(52) U.S. Cl.
 CPC ............ *G06F 3/1205* (2013.01); *G06F 3/1204* (2013.01); *G06F 3/126* (2013.01); *G06F 3/1275* (2013.01); *G06F 3/1285* (2013.01); *G06F 3/1294* (2013.01); *H04N 1/00* (2013.01); *H04N 1/00278* (2013.01); *H04N 1/00474* (2013.01); *G06F 3/121* (2013.01); *G06F 3/1273* (2013.01); *H04N 2201/0039* (2013.01); *H04N 2201/0081* (2013.01); *H04N 2201/0094* (2013.01)

(58) Field of Classification Search
 None
 See application file for complete search history.

(56) References Cited

U.S. PATENT DOCUMENTS 8,019,853 B2 * 9/2011 Machida ....................... 709/224

2005/0055641 A1 3/2005 Machida  
2005/0144161 A1 * 6/2005 Hirota ............................... 707/3  
2006/0274361 A1 * 12/2006 Kobayashi et al. .......... 358/1.15  
2008/0174819 A1 7/2008 Hada

FOREIGN PATENT DOCUMENTS

JP 10-269157 A 10/1998  
JP 2000-315182 A 11/2000  
JP 2002-218150 A 8/2002

OTHER PUBLICATIONS

Extended European Search Report issued in European Patent Application No. 14178998.2, mailed Dec. 5, 2014.

* cited by examiner

*Primary Examiner* — Ashish K Thomas  
*Assistant Examiner* — Neil R McLean  
(74) *Attorney, Agent, or Firm* — Merchant & Gould PC

(57) ABSTRACT

A non-transitory computer-readable storage medium having a computer program stored thereon and readable by a computer of a communication apparatus connected to a network including a plurality of image processing apparatuses, the computer program, when executed by the computer, causing the communication apparatus to perform operations including searching the plurality of image processing apparatuses, obtaining processing information, determining a plurality of executable image processing, which can be executed by the plurality of searched image processing apparatuses, by using the processing information, the plurality of executable image processing including complex processing that is configured to be executed by a first image processing apparatus and a second image processing apparatus, and displaying support information, which is for selecting an image processing from the plurality of executable image processing, on a display unit of the communication apparatus.

10 Claims, 15 Drawing Sheets

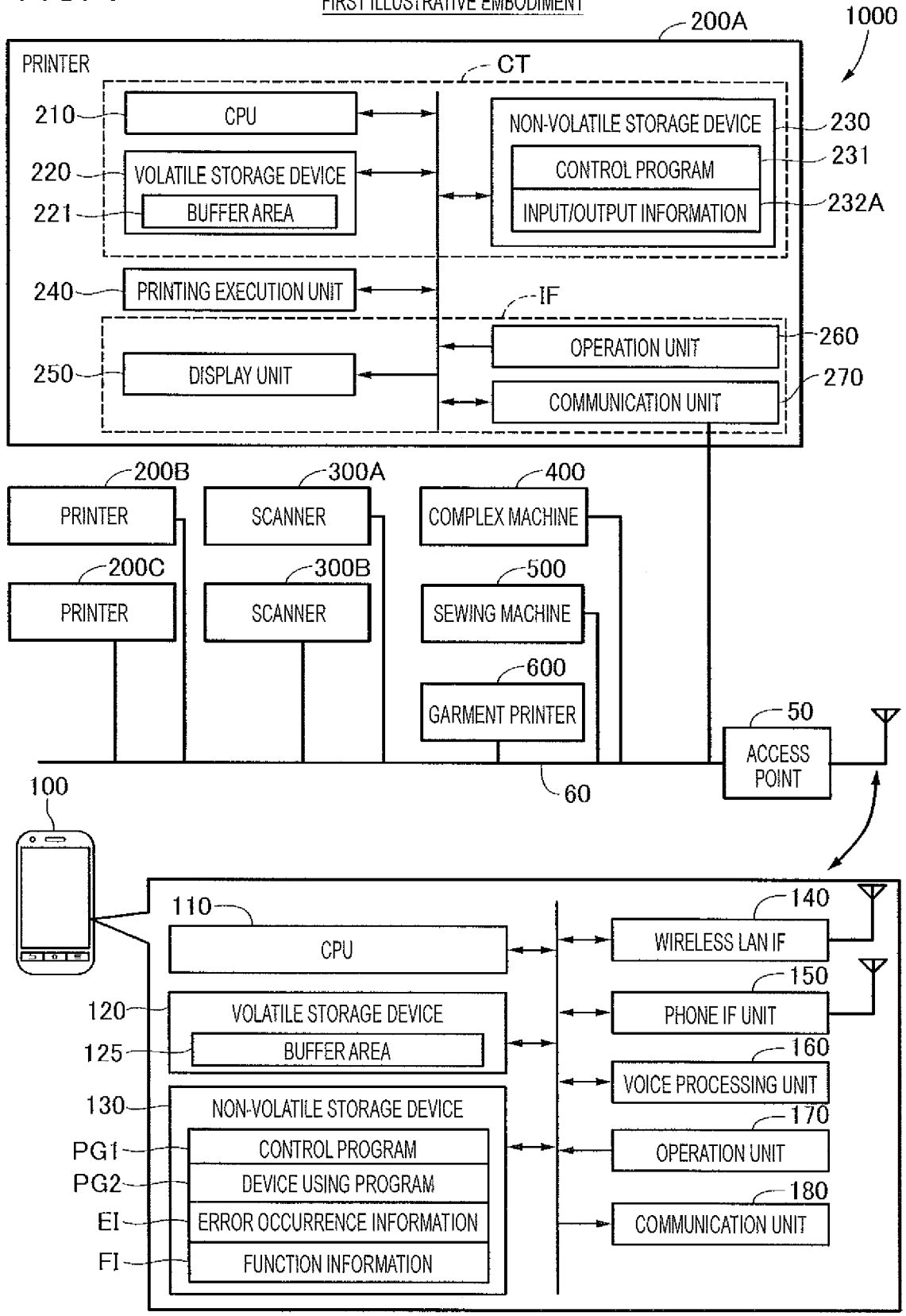

INPUT/OUTPUT INFORMATION

FIG. 2A — PRINTER 200A  232A

| INPUT | OUTPUT |
|---|---|
| DOT DATA<br>RGB<br>JPEG<br>POSTSCRIPT<br>PDF | SHEET |

FIG. 2B — PRINTER 200B  232B

| INPUT | OUTPUT |
|---|---|
| RGB<br>JPEG | SHEET |

FIG. 2C — PRINTER 200C  232C

| INPUT | OUTPUT |
|---|---|
| DOT DATA<br>POSTSCRIPT<br>PDF | SHEET |

FIG. 2D — SCANNER 300A  332A

| INPUT | OUTPUT |
|---|---|
| SHEET | RGB<br>JPEG<br>PDF |

FIG. 2E — SCANNER 300B  332B

| INPUT | OUTPUT |
|---|---|
| SHEET | RGB |

FIG. 2F — COMPLEX MACHINE 400  432

| INPUT | OUTPUT |
|---|---|
| RGB<br>JPEG<br>PDF | SHEET |
| SHEET | RGB<br>PDF |
| RGB<br>JPEG<br>PDF | FAX/G4 |

FIG. 2G — SEWING MACHINE 500  532

| INPUT | OUTPUT |
|---|---|
| RGB<br>JPEG | CLOTH (EMBROIDERY) |

FIG. 2H — GARMENT PRINTER 600  632

| INPUT | OUTPUT |
|---|---|
| RGB<br>JPEG | CLOTH (PRINT) |

ERROR OCCURRENCE INFORMATION

FIG. 3A

FIA

| PRINTER | SCANNER | FLAT BED-TYPE SCANNER | COMPLEX MACHINE | SEWING MACHINE | GARMENT PRINTER |
|---|---|---|---|---|---|
| PR-xxxxx<br>PR-aaaaa<br>PR-bbbbb<br>PR-ccccc<br>⋮ | SC-xxxxx<br>SC-aaaaa<br>SC-bbbbb<br>SC-ccccc<br>⋮ | SC-aaaaa<br>SC-ccccc<br>⋮ | MF-xxxxx<br>MF-aaaaa<br>MF-bbbbb<br>MF-ccccc<br>⋮ | SM-xxxxx<br>SM-aaaaa<br>SM-bbbbb<br>SM-ccccc<br>⋮ | GM-xxxxx<br>GM-aaaaa<br>GM-bbbbb<br>GM-ccccc<br>⋮ |

FIG. 3B

FIB

| INPUT DEVICE | OUTPUT DEVICE | COMPLEX PROCESSING |
|---|---|---|
| SCANNER | PRINTER | COPY |
| COMPLEX MACHINE | PRINTER | HIGH-SPEED COPY |
| SCANNER | COMPLEX MACHINE | COPY |
| FLAT BED-TYPE SCANNER | COMPLEX MACHINE | CARD FAX |
| SCANNER | SEWING MACHINE | EMBROIDERY COPY |
| SCANNER | GARMENT PRINTER | GARMENT COPY |
| ⋮ | ⋮ | ⋮ |

ERROR OCCURRENCE INFORMATION

| INPUT DEVICE | OUTPUT DEVICE | ERROR |
|---|---|---|
| SC-aaaaa | PR-aaaaa | MOIRE OCCURRENCE |
| SC-bbbbb | PR-aaaaa | DEFECT OF COLOR REPRODUCIBILITY |
| MF-aaaaa | PR-ccccc | COMMUNICATION ERROR |

FIG. 6

| INPUT DEVICE | OUTPUT DEVICE | COMPLEX PROCESSING | ERROR |
|---|---|---|---|
| SCANNER 300A | PRINTER 200A | COPY | MOIRE OCCURRENCE |
| | PRINTER 200B | COPY | COMMUNICATION ERROR |
| | PRINTER 200C | COPY | |
| | COMPLEX MACHINE 400 | CARD FAX/COPY | |
| | SEWING MACHINE 500 | EMBROIDERY COPY | |
| | GARMENT PRINTER 600 | GARMENT COPY | |
| SCANNER 300B | PRINTER 200A | COPY | DEFECT OF COLOR REPRODUCIBILITY |
| | PRINTER 200B | COPY | |
| | COMPLEX MACHINE 400 | CARD FAX/COPY | |
| COMPLEX MACHINE 400 | PRINTER 200A | HIGH-SPEED COPY | |
| | PRINTER 200B | HIGH-SPEED COPY | |
| | PRINTER 200C | HIGH-SPEED COPY | COMMUNICATION ERROR |
| | SEWING MACHINE 500 | EMBROIDERY COPY | |
| | GARMENT PRINTER 600 | GARMENT COPY | |

*FIG. 7A* SD1

Please select a function to be used
- Copy — BT1
- Copy to T-shirt — BT2
- Embroider Copy — BT3
- FAX — BT4
- Printing — BTa
⋮

*FIG. 7B* SD2

Please select a type of copy
- Usual Copy — BT5
- High-speed Copy — BT6

*FIG. 7C* SD3

Please select a device to be used
- Complex Machine 400 — BT7
- Scanner A + Printer C — BT8
- Scanner A + Complex Machine — BT9
- Scanner B + Printer B — BT10
- Scanner A + Printer A — BT11
- There is a possibility of moire — ED1
- Scanner A + Printer A — BT12
- There is a defect of color reproducibility — ED2

FIG. 9

OPERATION FLOW INFORMATION — OF

| | TARGET DEVICE | REQUEST/ RESPONSE | CONTENT |
|---|---|---|---|
| PF1 | SCANNER 300A | REQUEST | OPERATION CONFIRMATION |
| | | RESPONSE | OPERABLE |
| | | REQUEST | SCAN REQUEST |
| | | RESPONSE | SCAN DATA |
| PF2 | PRINTER 200B | REQUEST | OPERATION CONFIRMATION |
| | | RESPONSE | OPERABLE |
| | | REQUEST | RECEPTION STATE CONFIRMATION |
| | | RESPONSE | RECEIVABLE |
| | | REQUEST | PRINTING REQUEST (TRANSMIT PRINT DATA) |
| | | RESPONSE | RECEPTION COMPLETION |
| | | REQUEST | CONFIRMATION OF PRINTING COMPLETION |
| | | RESPONSE | PRINTING COMPLETION |

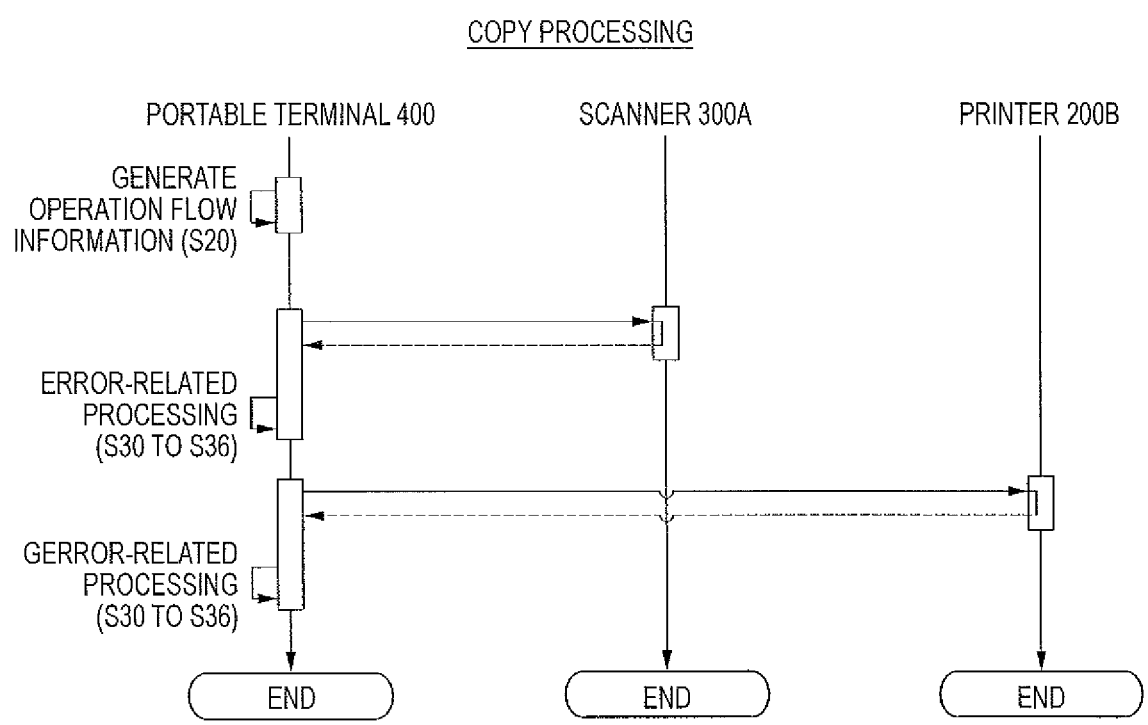

FIG. 13

SERVER 800     832S

| INPUT | OUTPUT |
|---|---|
| DOT DATA<br>RGB<br>JPEG<br>POSTSCRIPT<br>PDF | DOT DATA |

FIG. 14

FIC

| INPUT DEVICE | RELAY DEVICE | OUTPUT DEVICE | COMPLEX PROCESSING |
|---|---|---|---|
| SCANNER | SERVER | PRINTER | COPY<br>(MOIRE REMOVING PROCESSING) |
| SCANNER | SERVER | PRINTER | COPY<br>(BACKGROUND REMOVING PROCESSING) |

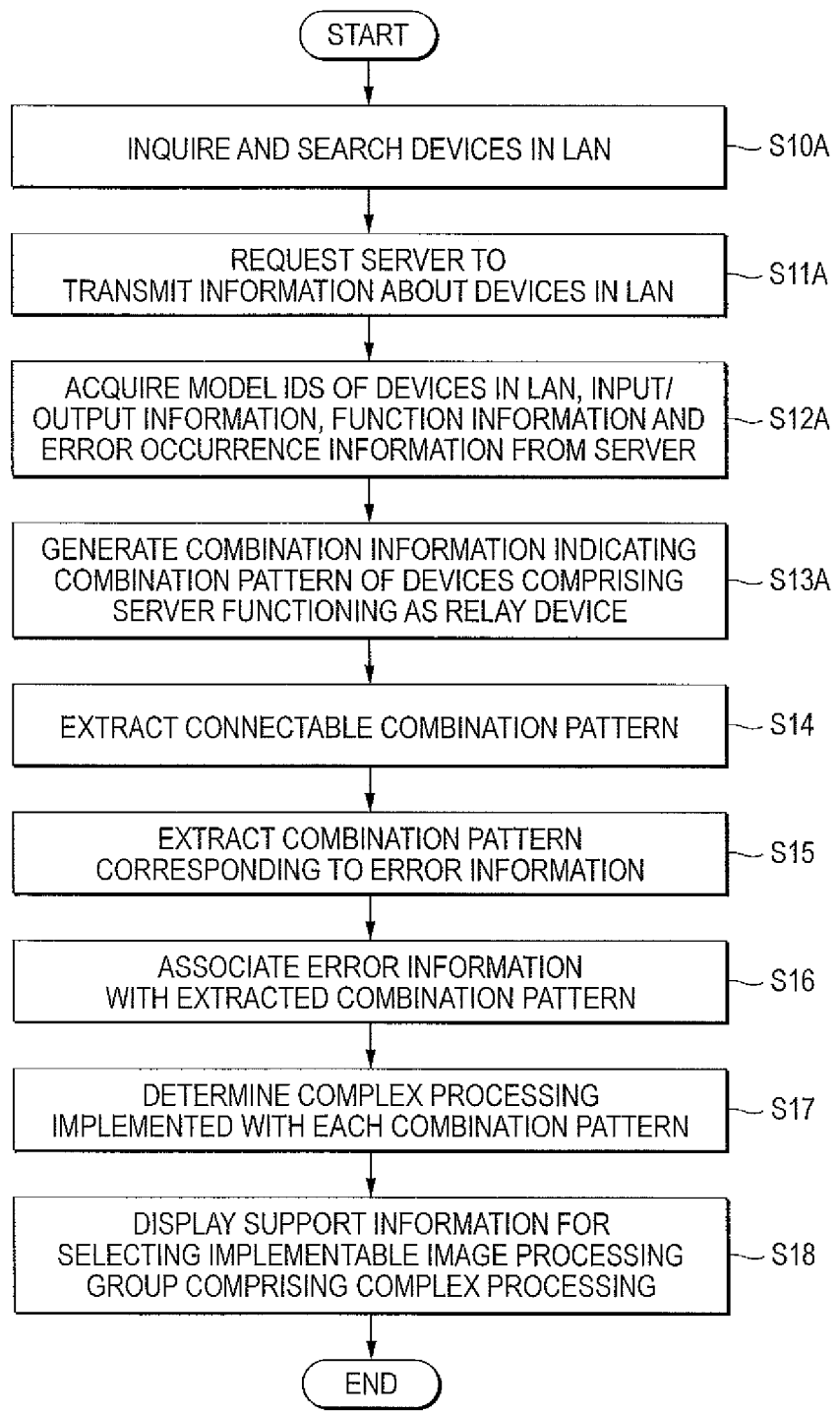

FIG. 16

OPERATION FLOW INFORMATION OF2

| | TARGET DEVICE | REQUEST/ RESPONSE | CONTENT |
|---|---|---|---|
| PF1 | SCANNER 300A | REQUEST | OPERATION CONFIRMATION |
| | | RESPONSE | OPERABLE |
| | | REQUEST | SCAN REQUEST |
| | | RESPONSE | SCAN DATA |
| PF3 | SERVER 800 | REQUEST | OPERATION CONFIRMATION |
| | | RESPONSE | OPERABLE |
| | | REQUEST | RECEPTION STATE CONFIRMATION |
| | | RESPONSE | RECEIVABLE |
| | | REQUEST | IMAGE PROCESSING REQUEST (TRANSMIT SCAN DATA) |
| | | RESPONSE | RECEPTION COMPLETION |
| | | REQUEST | CONFIRMATION OF IMAGE PROCESSING COMPLETION |
| | | RESPONSE | PROCESSED DOT DATA |
| PF2 | PRINTER 200A | REQUEST | OPERATION CONFIRMATION |
| | | RESPONSE | OPERABLE |
| | | REQUEST | RECEPTION STATE CONFIRMATION |
| | | RESPONSE | RECEIVABLE |
| | | REQUEST | PRINTING REQUEST (TRANSMIT PRINT DATA) |
| | | RESPONSE | RECEPTION COMPLETION |
| | | REQUEST | CONFIRMATION OF PRINTING COMPLETION |
| | | RESPONSE | PRINTING COMPLETION |

THIRD ILLUSTRATIVE EMBODIMENT

INPUT/OUTPUT INFORMATION

FIG. 17A

PRINTER 200A                    232A

| INPUT | OUTPUT |
|---|---|
| DOT DATA<br>RGB<br>JPEG<br>POSTSCRIPT<br>PDF | A3<br>A4 |

FIG. 17B

PRINTER 200B                    232B

| INPUT | OUTPUT |
|---|---|
| RGB<br>JPEG | A4 |

FIG. 17C

SCANNER 300A                    332A

| INPUT | OUTPUT |
|---|---|
| A3<br>A4<br>CARD | RGB<br>JPEG<br>PDF |

FIG. 17D

SCANNER 300B                    332B

| INPUT | OUTPUT |
|---|---|
| A4<br>CARD | RGB |

FIG. 18

FID

| INPUT DEVICE | OUTPUT DEVICE | COMPLEX PROCESSING |
|---|---|---|
| A3 | A3 | A3 COPY |
| A4 | A4 | A4 COPY |
| CARD | FAXG4 | CARD FAX |
| A3/A4 | CLOTH (EMBROIDERY) | EMBROIDERY COPY |
| A3/A4 | CLOTH (PRINT) | GARMENT COPY |
| ⋮ | ⋮ | ⋮ |

STORAGE MEDIUM AND COMMUNICATION APPARATUS

CROSS-REFERENCE TO RELATED APPLICATIONS

This application claims priority from Japanese Patent Application No. 2013-160015 filed on Jul. 31, 2013, the entire contents of which are incorporated herein by reference.

TECHNICAL FIELD

Aspects of the present invention relate to a control of a communication apparatus connected to a network including a plurality of image processing apparatuses, and more particularly, to a control for executing image processing by the plurality of image processing apparatuses.

BACKGROUND

A technology of combining and using a plurality of image processing apparatuses connected to a network has been known. For example, a system has been known which executes copy processing by a scanner and a printer, which is a separate device from the scanner. In this technology, a user can designate copy processing using a specific scanner and a specific printer by dragging and dropping a specific scanner icon on a specific printer icon on a setting screen displayed on a display apparatus of a personal computer (PC) connected to a network to which a plurality of scanners and a plurality of printers are connected.

SUMMARY

However, according to the above technology, when a larger number of the image processing apparatuses are included in the system, for example, the user may not be able to appropriately perceive the image processing that can be executed by the system.

In view of the above, aspects of the invention provide a technology enabling a user to appropriately perceive image processing that can be executed by a plurality of image processing apparatuses connected to a network.

Aspects of the invention can be realized in the following application examples:

(1) A non-transitory computer-readable storage medium having a computer program stored thereon and readable by a computer of a communication apparatus connected to a network including a plurality of image processing apparatuses, the computer program, when executed by the computer, causing the communication apparatus to perform operations including: searching the plurality of image processing apparatuses in the network; obtaining processing information being related to execution of image processing configured to be executed by each of the plurality of image processing apparatuses and is prepared for each of the plurality of image processing apparatuses; determining a plurality of executable image processing, which can be executed by the plurality of searched image processing apparatuses, by using processing information, the plurality of executable image processing including complex processing that is configured to be executed by a first image processing apparatus configured to execute first image processing and a second image processing apparatus configured to execute second image processing by using data obtained by executing the first image processing, and displaying support information, which is for selecting an image processing from the plurality of executable image processing, on a display unit of the communication apparatus.

According thereto, the support information for selecting the image processing including the complex processing, which is executed by the first image processing apparatus and the second image processing apparatus, in accordance with the plurality of image processing apparatuses in the network is displayed on the display unit. Therefore, a user can appropriately perceive the image processing that can be executed by the plurality of image processing apparatuses in the network.

(2) A communication apparatus connected to a network including a plurality of image processing apparatuses, the communication apparatus including: a processor; and a memory storing instructions that, when executed by the processor, cause the communication apparatus to perform: searching the plurality of image processing apparatuses in the network; obtaining processing information being related to execution of image processing configured to be executed by each of the plurality of image processing apparatuses and is prepared for each of the plurality of image processing apparatuses, determining a plurality of executable image processing, which can be executed by the plurality of searched image processing apparatuses, by using processing information, the plurality of executable image processing including complex processing that is configured to be executed by a first image processing apparatus configured to execute first image processing and a second image processing apparatus configured to execute second image processing by using data obtained by executing the first image processing, and displaying support information, which is for selecting an image processing from the plurality of executable image processing, on a display unit of the communication apparatus.

The present invention can be executed in various aspects. For example, the present invention can be executed in aspects such as a method of implementing functions of the computer program, a communication apparatus, a recording medium having the computer program recorded therein and the like.

BRIEF DESCRIPTION OF DRAWINGS

FIG. 1 is a block diagram showing a configuration of a system 1000 according to a first illustrative embodiment;

FIGS. 2A to 2H show an example of input/output information;

FIGS. 3A, 3B show an example of function information FI;

FIG. 4 shows an example of error occurrence information EI;

FIG. 6 shows an example of combination information SI indicating only connectable combination patterns;

FIGS. 7A to 7C show a display example of support information;

FIG. 9 shows an example of operation flow information OF;

FIG. 11 is a sequence diagram when a scanner 300A and a printer 200B are enabled to execute copy processing by the device control processing;

FIG. 13 shows input/output information 832S of a server 800;

FIG. 14 shows an example of a complex processing search table FIC;

FIG. 15 is a flowchart of UI display processing that is executed in the second illustrative embodiment;

FIG. 16 shows an example of operation flow information OF2 in the second illustrative embodiment;

FIGS. 17A to 17D show an example of input/output information in a third illustrative embodiment; and FIG. 18 shows an example of function information FID in the third illustrative embodiment.

DETAILED DESCRIPTION

A. First Illustrative Embodiment

A-1. Configuration of System

Figure 5:
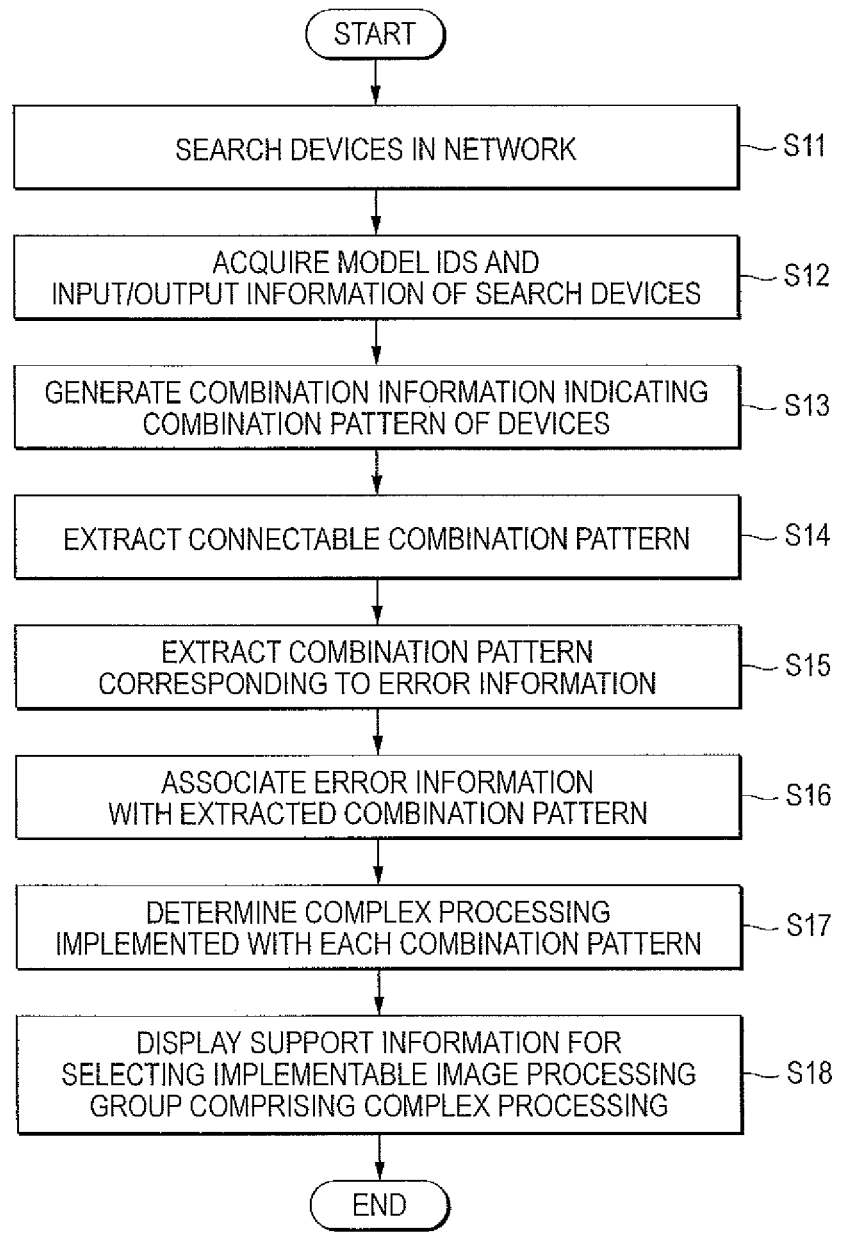
FIG. 5 is a flowchart of UI display processing that is executed in the first illustrative embodiment.

Hereinafter, illustrative embodiments of the present invention will be described. FIG. 1 is a block diagram showing a configuration of a system 1000 according to a first illustrative embodiment. The system 1000 has three printers 200A to 200C, two scanners 300A, 300B, a complex machine 400, a sewing machine 500, a garment printer 600, an access point 50 and a portable terminal 100. The eight devices (which are also referred to as image processing apparatuses) 200A to 200C, 300A, 300B, 400, 500, 600 and the access point 50 are connected to a local area network (LAN) 60.

The LAN 60 is a wired network established in a building and the like, based on the Ethernet (registered trademark) standard.

The access point 50 is an access point of a wireless LAN using a communication protocol defined by the standard such as IEEE 802.11a/b/g/n and the like. The portable terminal 100 is connected to the LAN 60 through the access point 50. Therefore, the portable terminal 100 can perform communication with the eight devices 200A to 200C, 300A, 300B, 400, 500, 600 through the access point 50 and the LAN 60.

The printer 200A has a control unit CT, an interface unit IF including a user interface and a communication interface, and a printing execution unit 240. The control unit CT has a CPU 210, a volatile storage device 220 such as a RAM and a non-volatile storage device 230 such as a hard disk drive, a flash memory and the like. The interface unit IF has a display unit 250 including a display panel of liquid crystals and the like, an operation unit 260 including a touch panel overlapping with the display panel, a button and the like and a communication unit 270 including an interface for performing data communication with an external device through the LAN 60. The printing execution unit 240 is a print engine printing an image on a sheet by using a predetermined method (for example, inkjet and laser).

The volatile storage device 220 is provided with a buffer area 221 in which a variety of intermediate data generated when the CPU 210 performs processing is temporarily stored. The non-volatile storage device 230 stores therein a control program 231 for controlling the printer 200A and input/output information 232A that will be described later.

The control program 231 is beforehand stored in the non-volatile storage device 230 upon shipment of the printer 200A, for example. Also, the control program 231 may be provided in a form stored in a CD-ROM and the like or in a form to be downloaded from a server.

The printers 200B, 200C have control units, interface units and printing execution units, which are not shown, like the printer 200A. Since the models of the printers 200A to 200C are different from each other, the specifications and the like of the printing execution units and the control programs are different from each other and formats of data to be input are different from each other, as described later. For this reason, the input/output information 232A, 232B, 232C (which will be described later with reference to FIG. 2) different from each other is stored in the printers 200A to 200C.

The scanners 300A, 300B have control units and interface units, which are not shown, like the printer 200A. Each of the scanners 300A, 300B has a reading execution unit (not shown) optically reading a document by an optical sensor (for example, CIS (Contact Image Sensor)), instead of the printing execution unit 240 of the printer 200A. Since the models of the scanners 300A, 300B are different from each other, the specifications and the like of the reading execution units and the control programs are different from each other and formats of read image data to be output are different from each other, as described later. For this reason, the input/output information 332A, 332B (which will be described later with reference to FIG. 2) different from each other is stored in the scanners 300A, 300B.

The complex machine 400 has a control unit, an interface unit and a printing execution unit, like the printer 200A, and has a reading execution unit, like the scanners 300A, 300B, which are not shown. Input/output information 432 (which will be described later with reference to FIG. 2) depending on the model of the complex machine 400 is stored in the complex machine 400. Further, the interface unit of the complex machine 400 has an interface for connecting to a telephone line. The control unit of the complex machine 400 can execute reading processing by the reading execution unit, printing processing by the printing execution unit and telephone communication processing of transmitting and receiving image data of a predetermined format (for example, FAXG4 format and the like) through the telephone line. Also, the control unit of the complex machine 400 can execute copy processing of printing an image of a document on a sheet by combining the reading processing and the printing processing. Also, the control unit of the complex machine can execute fax processing of transmitting image data indicating an image of a document through the telephone line and printing the image data received through the telephone line on a sheet by combining the reading processing, the printing processing and the telephone communication processing.

The sewing machine 500 has a control unit and an interface unit (not shown), like the printer 200A. The sewing machine 500 has a sewing execution unit that can embroider an image by reciprocating a sewing needle in a direction perpendicular to a predetermined plane along which a cloth to be sewn arranged on a sewing bed moves while moving the cloth along the plane, instead of the printing execution unit 240 of the printer 200A. The control unit of the sewing machine 500 can execute embroidery of an image indicated by the image data by generating embroidery data for embroidering an image by using the input image data and driving the sewing execution unit in accordance with the embroidery data. In the sewing machine 500, input/output information 532 (which will be described later with reference to FIG. 2) depending on a specification of the sewing machine 500 is stored.

The garment printer 600 has a control unit and an interface unit (not shown), like the printer 200A. The garment printer 600 has a printing execution unit for garment, which prints an image on a garment such as T-shirt by using the inkjet method, instead of the printing execution unit 240 of the printer 200A. In the garment printer 600, input/output information 632 (which will be described later with reference to FIG. 2) depending on a specification of the garment printer 600 is stored.

Since the printers 200A to 200C, the sewing machine 500 and the garment printer 600 are apparatuses for forming an image on a sheet and a cloth, they can be referred to as image forming apparatuses. Since the scanner is an apparatus for generating read image data by reading a document, it can be referred to as an image data generation apparatus. Also, since the complex machine 400 has both the printer function and the scanner function, it can be referred to as an image forming apparatus and also as an image data generation apparatus.

FIG. 2 shows an example of the input/output information. The input/output information includes input information and output information. For example, FIGS. 2A to 2C show the input/output information 232A to 232C of the printers 200A to 200C. The input information is information indicating a format of data that can be input, when there is data to be input for image processing to be executed by a target device. The image processing to be executed by the printers 200A to 200C is 'printing processing for a sheet'. An input for the printing processing is made in a form of image data. For this reason, as shown in FIGS. 2A to 2C, in the input/output information 232A to 232C of the printers 200A to 200C, the input information is information indicating a format of image data that can be input for the image processing. Specifically, the format of image data that can be input includes a format of bitmap data, a format of compressed image data and a format for preserving image data in a page unit, for example. The format of bitmap data includes formats of RGB image data indicating colors of pixels with gradation values of respective components of RGB, CMYK image data indicating colors of pixels with gradation values of respective components of CMYK, dot data indicating whether or not to form a printing dot for each pixel, and the like. The format of compressed image data includes formats of JPEG (Joint Photographic Experts Group), GIF (Graphics Interchange Format) and the like. The format for preserving image data in a page unit includes a format of a page description language such as PostScript and a PDF (Portable Document Format).

Specifically, the input information of the input/output information 232A of the printer 200A includes information indicating dot data, RGB image data, image data compressed by the JPEG method, image data described with the PostScript and image data preserved with the PDF (FIG. 2A). Also, the input information of the input/output information 232B of the printer 200B includes information indicating RGB image data and image data compressed by the JPEG method (FIG. 2B). The input information of the input/output information 232C of the printer 200C includes information indicating dot data, image data described with the PostScript and image data preserved with the PDF (FIG. 2C).

As can be seen from the above descriptions, the format of image data that can be input for the printing processing may be different depending on the models of the printers. In this illustrative embodiment, as shown in FIG. 2A, the dot data, the RGB image data, the image data compressed by the JPEG method, the image data described with the PostScript and the image data preserved with the PDF can be input to the printer 200A. In the meantime, as shown in FIG. 2B, the RGB image data and the image data compressed by the JPEG method can be input to the printer 200B. However, the image data of other formats cannot be input. Also, as shown in FIG. 2C, the dot data, the image data described with the PostScript and the image data preserved with the PDF can be input to the printer 200C. However, the image data of other formats cannot be input.

The output information is information indicating a form of output when an output of a result of the image processing executed by a target device is made in a form different from data. The output of a result of the printing processing is made in a form of 'sheet', not the image data. For this reason, the output information of the input/output information 232A to 232C of the printers 200A to 200C is information indicative of 'sheet' that is a form of the output of the printing processing.

The input information includes information indicative of a form of an input when an input for the image processing to be executed by a target device is made in a form different from data. The image processing to be executed by the scanners 300A, 300B is 'reading processing of a sheet (i.e., a document)'. An input for the reading processing is made in a form of 'sheet', not the image data. For this reason, as shown in FIGS. 2D and 2E, the input information of the input/output information 332A, 332B of the scanners 300A, 300B are information indicating the 'sheet' that is a form of an input for the reading processing.

The output information includes information indicative of a format of data that can be output, when there is data to be output as a result of the image processing executed by a target device. An output of a result of the reading processing is made in a form of the image data. For this reason, the output information of the input/output information 332A, 332B of the scanners 300A, 300B are information indicative of a format of image data that can be output by the reading processing.

Specifically, the output information of the input/output information 332A of the scanner 300A includes the information indicative of the RGB image data, the image data compressed by the JPEG method and the image data preserved with the PDF (FIG. 2D). Also, the output information of the input/output information 332B of the scanner 300A includes the information indicating the RGB image data (FIG. 2E).

As can be seen from the above descriptions, the format of the image data that can be output as a result of the reading processing may be different depending on the models of the scanners. In this illustrative embodiment, as shown in FIG. 2D, the scanner 300A can output the RGB image data, the image data compressed by the JPEG method and the image data preserved with the PDF and cannot output the image data of other formats. As shown in FIG. 2E, the scanner 300B can output only the RGB image data and cannot output the image data of other formats.

The image processing that is executed by the complex machine 400 includes the 'printing processing for a sheet', the 'reading processing of a document of a sheet' and the 'fax processing'. Therefore, in the complex machine 400, inputs for the printing processing and the fax processing are made in a form of image data and an input for the reading processing is made in a form of a 'sheet'. Also, in the complex machine 400, an output of a result of the printing processing is made in a form of a 'sheet' and outputs of results of the reading processing and the fax processing are made in a form of image data. For this reason, as shown in FIG. 2F, the input/output information 432 of the complex machine 400 includes the input and output information of the respective printing processing, reading processing and fax processing.

For example, in this illustrative embodiment, the input/output information 432 of the complex machine 400 includes information indicating the RGB image data, the image data compressed by the JPEG method and the image data preserved with the PDF, respectively, as the input information of the printing processing. Also, the input/output information 432 of the complex machine 400 includes information indicative of a 'sheet', as the output information of the printing processing. Also, the input/output information 432 of the complex machine 400 includes information indicating a 'sheet', as the input information of the reading processing, and includes information indicative of the RGB image data and the image data preserved with the PDF, respectively, as the output information of the reading processing. For example, the input/output information 432 of the complex machine 400 includes the same information as the input information of the printing processing, as the input information of the fax processing, and includes information indicative of the FAXG4 format, as the output information of the fax processing.

Also, the image processing that is executed by the sewing machine 500 is 'embroidery processing for a cloth'. An input for the embroidery processing is made in a form of image data, and an output of a result of the embroidery processing is made in a form of 'cloth (embroidery)', not the image data. For this reason, as shown in FIG. 2G, the input information of the input/output information 532 of the sewing machine 500 includes information indicating the RGB image data and the image data compressed by the JPEG. Also, the output information of the input/output information 532 includes information indicative of a 'cloth (embroidery)'.

Also, the image processing that is executed by the garment printer 600 is 'printing processing for a cloth'. An input for the printing processing is made in a form of image data, and an output of a result of the printing processing is made in a form of 'cloth (print)', not the image data. For this reason, as shown in FIG. 2H, the input information of the input/output information 632 of the garment printer 600 includes information indicating the RGB image data and the image data compressed by the JPEG. Also, the output information of the input/output information 632 includes information indicative of a 'cloth (print)'.

Returning back to FIG. 1, the portable terminal 100 is a multifunctional portable phone referred to as a smart phone. The portable terminal 100 mainly has a CPU 110, a volatile memory device 120 such as a RAM, a non-volatile memory device 130 such as a hard disk drive and a flash memory, a wireless IF unit 140, a phone IF unit 150, a voice processing unit 160 including a speaker and a microphone and implementing a phone function and the like, an operation unit 170 including a touch panel, an operating key and the like, and a display unit 180 including a liquid crystal panel overlapping with the touch panel and the like.

The wireless IF unit 140 includes an antenna and performs wireless communication with the access point 50 based on the standard such as IEEE 802.11a/b/g/n and the like. As a result, as described above, the portable terminal 100 can perform communication with the plurality of devices 200A to 200C, 300A, 300B, 400, 500, 600 connected to the LAN 60, through the access point 50 and the LAN 60.

The phone IF unit 150 includes an antenna and performs wireless communication with a base station (not shown) based on a portable phone communication method (for example, W-CDMA). The phone IF unit 150 is used for connection to an Internet 70 through a phone and a base station, for example.

The volatile memory device 120 is provided with a buffer area 125 in which a variety of intermediate data generated when the CPU 110 performs processing is temporarily stored.

The non-volatile memory device 130 stores therein a control program PG1, a device using program PG2, error occurrence information E1 and function information FI. The control program PG1 is a program for implementing a basic function of the portable terminal 100, such as a function of an operating system (OS) and a phone function. The control program PG1 is provided by a manufacturer of the portable terminal 100, for example, and is beforehand stored upon shipment. The device using program PG2 is a program for implementing a function for remotely operating the plurality of devices 200A to 200C, 300A, 300B, 400, 500, 600 connected to the LAN 60. The device using program PG2 is a program (also referred to as an 'application' and the like) for adding a new function to the portable terminal 100, and is provided by a provider (for example, a manufacturer of a device) different from the portable terminal 100 so that it can be downloaded from a predetermined server, for example. Also, the device using program PG2 may be provided by the manufacturer of the portable terminal 100 and may be beforehand stored upon the shipment.

FIG. 3 shows an example of the function information FI. The function information FI is information in which a pair (hereinafter, simply referred to as a pair of devices) of an input device and an output device is associated with a type of a function of complex processing that can be executed by the pair of devices. In this illustrative embodiment, the complex processing includes image processing of an input-side that is executed by an input device and image processing of an output-side that is executed by an output device. The input device is a device to which information for complex processing is input. The information for complex processing is input in a form of image data or in a form of a document of a sheet. The output device is a device that outputs a result of the complex processing. In this illustrative embodiment, five types of the complex processing, i.e., copy processing, high-speed copy processing, card fax processing, embroidery copy processing and garment copy processing are assumed.

The copy processing is executed by a scanner functioning as an input device for reading a document and a printer functioning as an output device for printing an image on a sheet by using read image data output from the scanner. The high-speed copy processing is executed by a complex machine functioning as an input device for reading a document and a printer functioning as an output device for printing an image on a sheet by using read image data output from the complex machine. In the high-speed copy processing, the printing execution unit of the complex machine and the printer execute a printing of the same image in parallel by using the same image data. As a result, it is possible to execute the higher-speed copy processing, as compared to a configuration where the complex machine alone executes the copy processing. The card fax processing is executed by a flat bed-type scanner functioning as an input device for reading a thick document such as a credit card and a license and a printer functioning as an output device for printing an image on a sheet by using read image data output from the flat bed-type scanner. The embroidery copy processing is executed by a scanner functioning as an input device for reading a document and a sewing machine for embroidering an image on a cloth by using read image data output from the scanner. The garment copy processing is executed by a scanner functioning as an input device for reading a document and a garment printer for printing an image on a cloth by using read image data output from the scanner.

The function information FI includes a model search table FIA (FIG. 3A) and a complex processing search table FIB (FIG. 3B). The model search table FIA associates and stores therein a type of a device and a model identifier (also referred to as a model ID) of a device. The type of a device is largely classified into six types, i.e., a printer, a scanner, a flat bed-type scanner, a complex machine, a sewing machine and a garment printer. As the model ID, a model number of a device (PR-xxxxx and the like, in the example of FIG. 3A) is used. The scanner includes a flat bed-type scanner and an ADF (auto document feeder)-type scanner. Therefore, the model ID of the flat bed-type scanner is associated with two types of the 'flat bed-type scanner' and the 'scanner'. As a result, when the model search table FIA is searched by using a model ID of a device as a search key, a type of a device can be specified.

The complex processing search table FIB associates and stores therein a pair of a type of an input device and a type of an output device and a type of a function of complex processing that can be executed by the pair of devices. For example, as shown in FIG. 3B, the copy processing is associated as a type of the complex processing with a pair of a scanner functioning as an input device and a printer functioning as an output device.

When referring to the two tables FIA, FIB, it is possible to specify a type of a function of the complex processing, which is executed by the pair of devices corresponding to the two model IDs, by using a model ID of an input device and a model ID of an output device as search keys. In the meantime, the function information FI consists of the two tables FIA, FIB. Instead of this configuration, one table in which a pair of a model ID of an input device and a model ID of an output device is directly associated with a type of the complex processing may be used as the function information FI. The function information FI is provided with being beforehand inserted in the device using program PG2. The processing using the function information FI will be described later.

FIG. 4 shows an example of the error occurrence information EI. The error occurrence information EI is a table in which a pair of model IDs indicating a pair of devices in which an error occurs is associated with a type of the error. The type of an error includes a communication error, an occurrence of a moiré and a defect of color reproducibility, for example.

The communication error includes an error that an output device cannot receive image data output from an input device and an error that an output device can receive image data output from an input device but cannot process the image data. Specifically, the communication error includes a case where an output device does not correspond to reception of a format of image data output from an input device. Also, the communication error includes a case where an output device can correspond to reception of a format of image data output from an input device but the output device cannot execute the image processing by using the image data due to a detailed specification of the format (which will be described later), a capacity shortage of a memory of the output device and the like. The error information of a pair of devices in which the communication error occurs or may occur may be inserted in the device using program PG2 with being beforehand registered in the error occurrence information EI, or may be added to the error occurrence information EI when an error actually occurs, as described later.

The moiré is a phenomenon that a plurality of spatial frequency components included in a printed image interferes with each other and thus an unintended interference fringe appears in the printed image. It is known that the lower a reading resolution of a scanner generating image data to be used for printing, the moiré is more likely to occur. Also, it is possible to suppress the moiré from occurring by executing image processing (also referred to as moiré removing processing) for removing the moiré for the image data to be used for printing. As the moiré removing processing, processing of adding a noise to the image data to reduce a plurality of spatial frequency components included in a printed image and the like are known. Therefore, the error information, which indicates that there is a high possibility that the moiré will occur, is registered in the error occurrence information EI for a pair of a scanner having a lower reading resolution than a reference resolution (for example, 300 dpi) and a printer incapable of executing the moiré removing processing. Also, for example, the error information, which indicates that there is a possibility that the moiré will occur, is registered in the error occurrence information EI for a pair of a scanner and a printer including at least one device of a scanner having a lower reading resolution than the reference resolution and a printer incapable of executing the moiré removing processing.

The defect of color reproducibility may occur when a color region, which can be expressed by image data (for example, read image data) output from an input device, is excessively narrower than a color region, which can be expressed by an image (for example, a printed image or embroidered image) output from an output device. This is because it is not possible to sufficiently exhibit an expression ability of the color region of the output device. Also, the defect may occur when a color region, which can be expressed by an image output from an output device, is excessively narrower than a color region, which can be expressed by image data output from an input device. This is because it is not possible to sufficiently express an image, which is expressed by the image data output from the input device, by an image output from the output device. For this reason, the error information, which indicates that there is a possibility that the defect of color reproducibility will occur, is registered in the error occurrence information EI for a pair of devices having a difference of a reference value or larger between an area of a color region, which can be expressed by image data output from an input device, and an area of the color region, which can be expressed by an image output from an output device. For example, in the case that two color regions are expressed in the same color space (for example, La*b*color space), when a difference between volumes of the two color regions is a predetermined ratio (for example, 20%) or higher of a volume of a larger color region of the two color regions, it may be determined that there is a possibility that the defect of color reproducibility will occur.

It can be said that the communication error and the error of color reproducibility relate to a mismatch of abilities of two devices (for example, an adapting ability to a data format and a color expression ability).

A-2. Operations of System

A-2-1. UI Display Processing:

Regarding the operations of the system 1000, UI display processing that is executed by the portable terminal 100 is described. FIG. 5 is a flowchart of the UI display processing that is executed by the CPU 110 of the portable terminal 100. The UI display processing is to display an UI image for enabling one or more devices of the plurality of devices in the system 1000 to execute the image processing on the display unit 250 of the portable terminal 100. The UI display processing starts when a user starts up the device using program PG2 with the portable terminal 100 so as to enable the plurality of devices in the system 1000 to execute the image processing. The UI display processing is processing that is executed as the CPU 110 executes the device using program PG2.

When the UI display processing starts, the CPU 110 searches a device in the LAN 60, as a candidate of the device to execute the image processing, in the first step S11. Specifically, the CPU 110 broadcasts a predetermined search packet on the LAN 60. As a result, the search packet is transmitted to all devices connected to the LAN 60, i.e., the eight devices 200A to 200C, 300A, 300B, 400, 500, 600 in the example of FIG. 1.

Each device having received the search packet transmits a response packet including an IP address and a MAC address of the device to the portable terminal 100 that is a transmission source of the search packet. The CPU 110 of the portable terminal 100 receives the response packet to search whether there is a device that is a candidate of a device enabled to execute the image processing and to acquire an IP address for accessing the corresponding device. In the example of FIG. 1, the eight devices 200A to 200C, 300A, 300B, 400, 500, 600 are searched.

In step of S12, the CPU 110 acquires model IDs and the input/output information (FIG. 2) of the searched devices from the searched devices. Specifically, the CPU 110 transmits a transmission request of the corresponding information to each of the searched devices. Each device having received the transmission request transmits a response including the model ID and the input/output information of the device to the portable terminal 100. As a result, the portable terminal 100 acquires the respective model IDs and input/output information 232A, 232B, 332A, 332B, 432, 532, 632 (FIG. 2) of the eight devices 200A to 200C, 300A, 300B, 400, 500, 600, in the example of FIG. 1. In the meantime, the communication between the portable terminal 100 and each device is performed using the HTTP (Hypertext Transfer Protocol), for example.

In step S13, the CPU 110 generates combination information, which indicates a pattern (hereinafter, referred to as a combination pattern) of a pair of an input device and an output device obtained by combining two devices of the eight devices. In the combination information, all combination patterns are recorded. The generated combination information is stored in the buffer area 125. For example, when there are the eight devices, a total number PN of the combination patterns is 56.

In step S14, the CPU 110 extracts a connectable combination pattern from all the combination patterns. Specifically, when a format of image data, which is output as a result of the image processing executed by an input device, can be input for the image processing executed by an output device, a pair of the input device and the output device is extracted as a connectable combination pattern. The CPU 110 extracts the connectable combination pattern by referring to the combination information generated in step S13 and the input/output information 232A, 232B, 332A, 332B, 432, 532, 632 acquired in step S12. In the meantime, a device of which an output is not the image data, i.e., the printers 200A to 200C, the sewing machine 500 and the garment printer 600 of which an output form is a 'sheet' or 'cloth' cannot be an input device (refer to FIG. 2). A device of which an input is not the image data, i.e., the scanners 300A, 300B of which an input form is a 'sheet' cannot be an output device (refer to FIG. 2). In the complex machine 400, an input may be the image data and an output may also be the image data. Therefore, the complex machine 400 can be any of an input device and an output device (refer to FIG. 2). The CPU 110 deletes patterns other than the extracted connectable combination pattern from the combination information generated in step S13.

FIG. 6 shows an example of combination information SI indicating only the connectable combination patterns obtained by combining the eight devices shown in FIG. 1. In the example of FIG. 6, it can be seen that the fourteen combination patterns of the 56 combination patterns are extracted as the connectable combination pattern. Meanwhile, in the combination information SI of FIG. 6, a device is specified by a name and a reference numeral (the printer 200A and the like) of each device so as to easily understand FIG. 6. However, each device is actually specified using inherent information of each device such as an IP address, for example. In this illustrative embodiment, since two or more devices of the same model may exist in the system 1000, the model ID (model number) is not used to specify each device.

In step S15, the CPU 110 extracts a combination pattern corresponding to the error information from the connectable combination patterns. Specifically, the CPU 110 searches the error occurrence information EI (FIG. 4) by using the model ID of each device as a key, thereby extracting the combination pattern registered in the error occurrence information EI.

In step S16, the CPU 110 associates the error information with the extracted combination pattern. Specifically, the CPU 110 acquires the error information corresponding to the combination pattern from the error occurrence information EI and associates the acquired error information with the combination pattern and records the same in the combination information SI (FIG. 6). In the example of FIG. 6, the error information indicating that there is a possibility that the moiré will occur is associated with the combination pattern of the scanner 300A and the printer 200A. Also, the error information indicating that there is a possibility that the defect of color reproducibility will occur is associated with the combination pattern of the scanner 300B and the printer 200A. Also, the error information indicating that there is a possibility that the communication error will occur is associated with the combination pattern of the complex machine 400 and the printer 200C.

In step S17, the CPU 110 determines the complex processing that is executed by each connectable combination pattern. Specifically, the CPU 110 specifies the types of the input and output devices configuring the combination pattern of a processing target by searching the model search table FIA (FIG. 3A) by using the model IDs of the devices as the search key. Then, the CPU 110 specifies the complex processing corresponding to the combination pattern of a processing target by searching the complex processing search table FIB by using the pair of the types of the devices corresponding to the combination pattern of a processing target as the search key. The specified complex processing is determined as the complex processing that is executed by the combination pattern of a processing target. For example, a case is described in which the model ID of the input device configuring the combination pattern of a processing target is 'SC-xxxxx' and the model ID of the output device is 'PR-aaaaa'. The CPU 110 refers to the model search table FIA to specify that the input device is a 'scanner' and the output device is a 'printer'. Then, the CPU 110 refers to the complex processing search table FIB to specify that the 'copy processing' is executed by the pair of the 'scanner' functioning as the input device and the 'printer' functioning as the output device. Therefore, the complex processing that is executed by the combination pattern of a processing target is determined as the 'copy processing'. Here, the complex processing that is executed by one combination pattern may be determined in plural. For example, the complex processing that is executed by the combination pattern of the scanner 300A and the complex machine 400 of FIG. 6 is determined as two processing of the 'card fax processing' and the 'copy processing'.

In step S18, the CPU 110 displays, on the display unit 180, support information for enabling a user to select the desired image processing from an executable image processing group including the complex processing, based on the combination information SI of FIG. 6.

FIG. 7 shows a display example of the support information. Specifically, the CPU 110 displays, on the display unit 180, a first selection image SD1 for enabling a user to select the image processing to be executed, as shown in FIG. 7A. The first selection image SD1 includes a plurality of selection buttons BT1 to BT4 corresponding to a plurality of executable complex processing. Also, the first selection image SD1 may include a selection button (for example, a button BTa) corresponding to the image processing that can be executed by a stand-alone device. However, since the corresponding button can be displayed by a well-known technology inasmuch as a type of a stand-alone device can be specified by referring to the model search table FIA, the description thereof will be hereinafter omitted. In each selection button, a name of a function of the corresponding image processing is displayed as the support information. The selection button BT1 is a button corresponding to the copy processing and the high-speed copy processing (refer to FIG. 6), and the selection button BT2 is a button corresponding to the garment copy processing (refer to FIG. 6). The selection button BT3 is a button corresponding to the embroidery copy processing (refer to FIG. 6) and the selection button BT4 is a button corresponding to the card fax processing (refer to FIG. 6) and the usual fax processing executed by a stand-alone complex machine. The user can select a button corresponding to the image processing to be executed from the selection buttons BT1 to BT4.

When the image processing corresponding to the selection buttons BT1 to BT4 can be classified more specifically depending on the functions, a second selection image including support information for enabling the user to select the specifically classified image processing is displayed on the display unit 180. FIG. 7B shows an example of the second selection image SD2 that is displayed on the display unit 180, instead of the first selection image SD1, when the user selects the selection button BT1 corresponding to the copy processing in the first selection image SD1 (FIG. 7A). The second selection image SD2 includes two selection buttons BT5, BT6 corresponding to the usual copy processing and the high-speed copy processing. In each selection button, a name (the usual copy processing, the high-speed copy processing) of a function of the more specifically classified image processing is displayed. The user can select a button corresponding to the image processing to be executed from the selection buttons BT5, BT6.

When the user selects one image processing through the first selection image SD1 and the selected image processing cannot be more specifically classified or when the user one image processing through the first selection image SD1 and selects one image processing through the second selection image SD2, a third selection image for enabling a user to select a device for executing the selected image processing is displayed on the display unit 180. FIG. 7C shows an example of the third selection image SD3 that is displayed when the user selects the selection button BT5 corresponding to the usual copy processing in the second selection image SD2. The third selection image SD3 includes a plurality of buttons BT7 to BT12 corresponding to a stand-alone device and combination patterns of devices capable of executing the usual copy processing. In the buttons BT7 to BT12, the support information providing a user with the corresponding combination pattern is displayed. For example, the selection button BT8 is a button corresponding to the combination pattern of the printer 200A and the scanner 300A and the selection button BT9 is a button corresponding to the combination pattern of the printer 200A and the complex machine 400.

In the meantime, when displaying a selection button corresponding to the combination pattern (refer to FIG. 6) associated with the error information in the third selection image SD3, the CPU 110 displays error-related support information. In the example of FIG. 7C, regarding a combination pattern having a possibility that the moiré will occur and a combination pattern having a possibility that the defect of color reproducibility will occur, support information ED1, ED2 for warning a user about the errors is displayed. Also, the CPU 110 does not display support information for selecting a combination pattern associated with other specific error information in the third selection image SD3. In the example of FIG. 7C, the selection buttons corresponding to the combination pattern of the scanner 300A and the printer 200B in which the communication error may occur and the combination pattern of the complex machine 400 and the printer 200C are not displayed (i.e., the corresponding combination patterns are excluded from the candidates for selection). The reason is as follows: when the combination pattern having a possibility that the moiré or the defect of color reproducibility will occur is used, the moiré or the defect of color reproducibility may occur but the copy processing can be executed. However, when the combination pattern having a possibility that the communication error will occur is used, there is a possibility that the copy processing cannot be executed.

Instead of the above configuration, the CPU 110 may display a selection button corresponding to the combination pattern associated with the error information about the communication error and the support information for warning a user about the communication error. Also, the CPU 110 may not display a selection button corresponding to the combination pattern having a possibility that the moiré or defect of color reproducibility will occur.

As can be seen from the above descriptions, the support information of this illustrative embodiment includes the information (specifically, the name of the function of the image processing) for enabling a user to recognize the function of the image processing, the information (specifically, the names of the devices configuring the combination pattern) for enabling a user to recognize the combination pattern of the devices for executing the image processing and the information (specifically, the error warning) for enabling a user to recognize an error that may occur when the image processing is executed (refer to FIG. 7). In this way, the support information may include a variety of helpful information so that the user selects the appropriate image processing to be executed and the appropriate device in the system 1000 is thus enabled to execute the corresponding image processing.

When the user selects a stand-alone device or combination pattern of the devices enabled to execute the image processing in the third selection image SD3, the CPU 110 ends the UI display processing and executes device control processing that will be described later.

According to the UI display processing of the first illustrative embodiment as described above, the CPU 110 searches the plurality of devices in the system 1000, i.e., in the LAN 60 (step S11). Then, the CPU 110 determines the candidates of the image processing that can be executed by the system 1000, including the complex processing executed by the plurality of devices in the network (steps S12 to S17 in FIG. 5). Upon the determination, the CPU 110 uses the input/output information 232A, 232B, 332A, 332B, 432, 532, 632 (FIG. 2), which is prepared for each device, as the information related to the execution of the image processing to be executed by each device. Then, the CPU 110 displays the support information for enabling the user to select the determined image processing on the display unit 180 (step S18 of FIG. 5, FIG. 7).

As a result, the support information for selecting the image processing including the complex processing, which is executed by the pair of devices, is appropriately displayed depending on the plurality of devices in the system. Therefore, the user can appropriately perceive the image processing that can be executed by the plurality of devices in the system. As a result, it is possible to improve the convenience of the system including the plurality of devices. In particular, when a large number of devices are included in the system, it may be difficult for the user to perceive the executable image processing. However, according to the UI display processing of this illustrative embodiment, the user can easily perceive the image processing that can be executed by the plurality of devices in the system.

Also, even though the user does not designate the plurality of devices to be combined, the candidates of the combination pattern of the devices are displayed (FIG. 7C). Therefore, even a user having a little knowledge about the devices can easily use the image processing (i.e., the complex processing) by using the plurality of devices.

Furthermore, as can be seen from the descriptions of step S14 and FIG. 6, the CPU 110 refers to the information (for example, the input/output information 332A), which indicates the format (for example, JPEG or RGB) of the data that is output by the image processing executed by the first device (for example, the scanner 300A), and the information (for example, the input/output information 232A), which indicates the format of the data that can be input for the image processing executed by the second device (for example, the printer 200A). When the data output from the first device can be input to the second device, specifically, when at least one of the formats of the data output from the first device is included in the formats that can be input to the second device, the CPU 110 determines the complex processing, which is executed by the first device and the second device, as the executable image processing. Therefore, it is possible to appropriately determine the executable image processing, based on the format of the data output from the first device and the format of the data that can be input to the second device.

Furthermore, as can be seen from the descriptions of step S17 and FIG. 3, the executable image processing is determined based on the function information FI in which the combination of the type (for example, the type depending on the function of the scanner and the like, the model identified by the model ID) of the first device and the type of the second device is associated with the type (for example, the copy processing) of the function of the complex processing. As a result, it is possible to appropriately determine the executable image processing, based on the type of the first device and the type of the second device.

Further, as for the combination pattern in which the specific error (for example, the moiré or defect of color reproducibility) may occur, the error-related warning is displayed on the display unit 180 (FIG. 7C). Therefore, the user can appropriately select the appropriate combination pattern of devices. For example, it is possible to suppress the user from selecting the complex processing in which an error may occur.

Further, since the support information (specifically, the selection button for selecting the corresponding combination pattern) for selecting the combination pattern in which another specific error (for example, the communication error) may occur is not displayed on the display unit 180 (FIG. 7C), it is possible to suppress the user from selecting the complex processing in which an error may occur.

A-2-2. Device Control Processing:

The device control processing that is executed by the CPU 110 of the portable terminal 100 is described. The device control processing is executed subsequently to the UI display processing when the image processing to be executed and the stand-alone device or combination pattern of devices enabled to execute the image processing are selected in the UI display processing. In the below, a case is exemplified in which a combination pattern of the scanner 300A functioning as an input device and the printer 200B functioning as an output device is selected. The device control processing is processing that is executed as the CPU 110 executes the device using program PG2, like the UI display processing. The device control processing is processing for controlling the operations of the respective devices configuring the selected combination pattern and confirming a progressing status of the operations of the respective devices.

Figure 8:
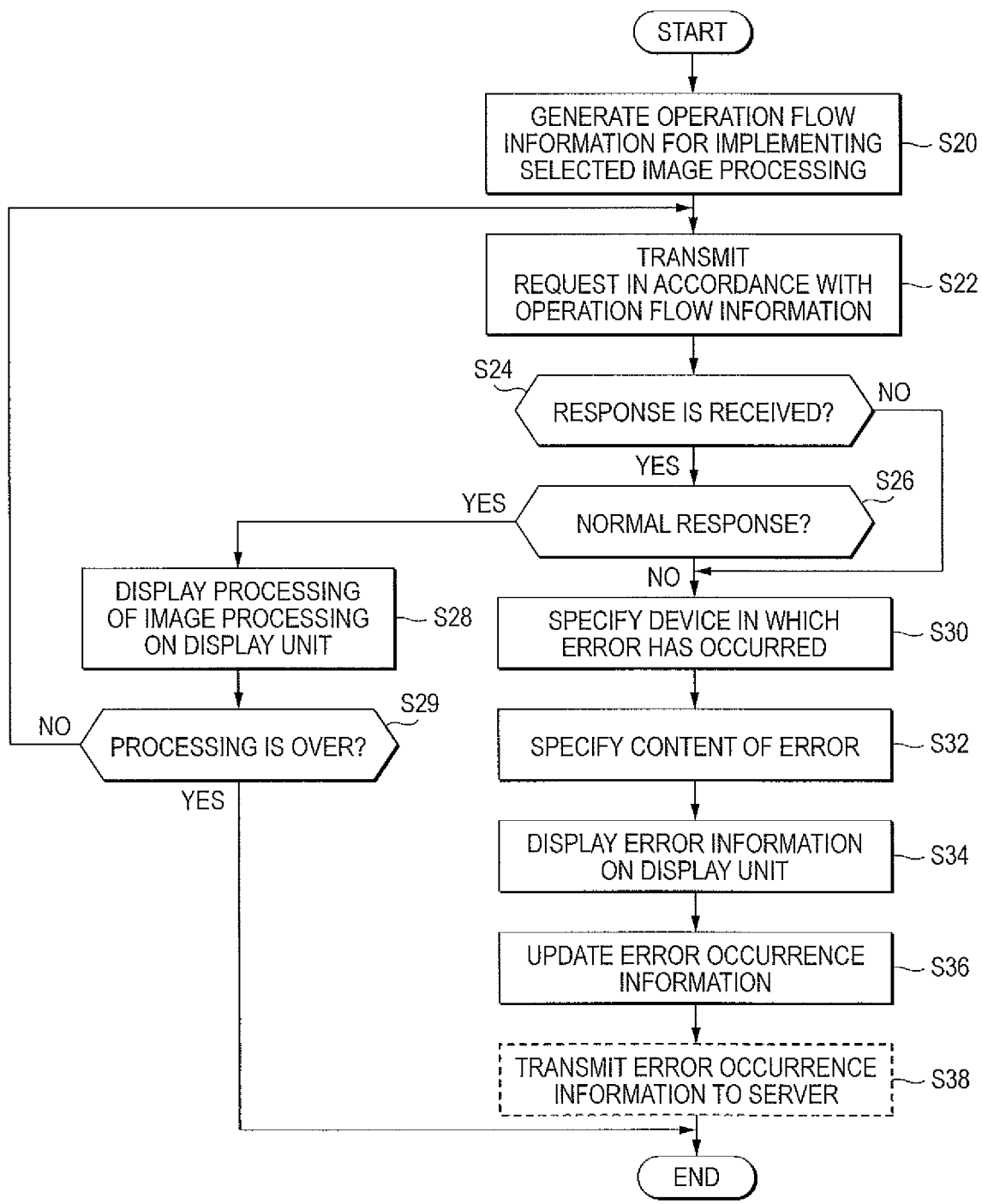
FIG. 8 is a flowchart of device control processing.

FIG. 8 is a flowchart of the device control processing. When the device control processing starts, the CPU 110 generates operation flow information OF for executing the image processing, which is selected by the user, by using the combination pattern of devices selected by the user.

FIG. 9 shows an example of the operation flow information OF. FIG. 9 shows an example of the operation flow information OF for executing the copy processing by the scanner 300A and the printer 200B. In this illustrative embodiment, the CPU 110 of the portable terminal 100 repeats processing of transmitting a request to a device of a control target (hereinafter, referred to as a target device) and receiving a response from a device of a transmission destination, thereby controlling the target device. Therefore, in this illustrative embodiment, the operation flow information OF is information in which a sequence of repeating the set of the request and the response is described so as to control the target device. The operation flow information OF includes partial flow information in which a set of the request and the response for each target device is described. For example, the operation flow information OF shown in FIG. 9 includes partial flow information PF1 for the scanner 300A and partial flow information PF2 for the printer 200B (FIG. 9). The operation flow information OF is generated based on a template that is beforehand prepared for each complex processing to be executed, for example. In this illustrative embodiment, the template of the operation flow information OF is beforehand stored in the portable terminal 100. The operation flow information OF may be stored in each device for each partial flow information for each device. In this case, the portable terminal 100 may acquire the partial flow information corresponding to each device from each device used for execution of the complex processing and combine the partial flow information to generate the operation flow information OF.

In step S22, the CPU 110 transmits the request to the target device in accordance with the operation flow information OF. For example, in the example of FIG. 6, in first step S22, the CPU 110 transmits, as a first request, a request (i.e., the operation confirmation of FIG. 9) for confirming whether the scanner 300A is powered and is at an operable state to the scanner 300A. Also, in second step S22 that is executed when the processing is returned to step S22 via the processing of steps S24 to S29 (which will be described later), the CPU 110 transmits a request (i.e., the scan request of FIG. 9) for requesting execution of the reading processing to the scanner 300A. In this way, in step S22, the request is sequentially transmitted to the target device in accordance with the operation flow information OF.

In step S24, the CPU 110 determines whether a response to the request is received from the target device within a predetermined time period according to a content of the request from the transmission of the request. When a response is not received (step S24: NO), the CPU 110 proceeds to step S30.

When a response is received (step S24: YES), the CPU 110 determines whether the received response is a normal response (step S26). A content of the normal response is described in the operation flow information OF (FIG. 9). Although specifically described later, in the example of FIG.

9, when the transmitted request is a request for 'operation confirmation', the normal response is a response indicating that an 'operation is possible'.

When the received response is not a normal response (step S26: NO), the CPU 110 proceeds to step S30. When the received response is a normal response (step S26: YES), the CPU 110 displays a progressing of the image processing on the display unit 180 (step S28).

Figure 10A:
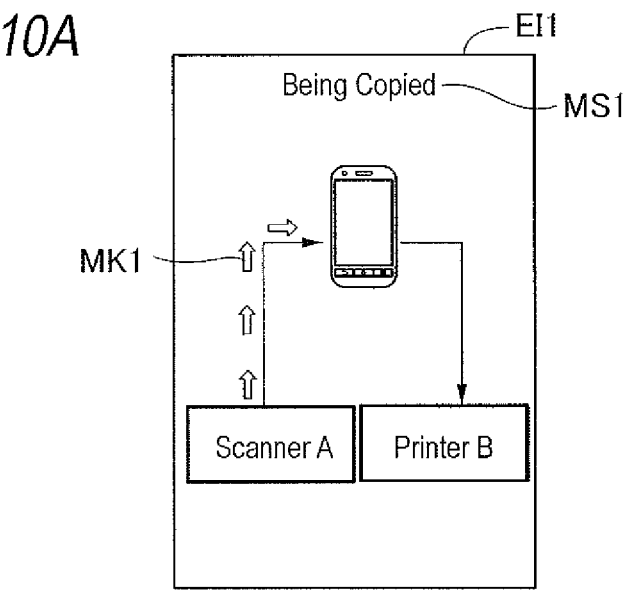
FIGS. 10A, 10B show an example of a progressing image for displaying progressing of image processing.

FIG. 10 shows an example of a progressing image for displaying progressing of the image processing. FIG. 10A shows a progressing image EI1 that is displayed at a normal state where an error does not occur. The progressing image EI1 includes a message MS1 indicating that the copy processing is being executed and a mark MK1 indicating that the reading processing of the scanner 300A is being executed, as the progressing information.

In step S29, the CPU 110 determines whether the image processing to be executed is over. Specifically, when a final request described in the operation flow information OF is transmitted, i.e., when there is no request that is not transmitted yet, the CPU 110 determines that the image processing to be executed is over. When there is a request that is not transmitted yet, the CPU 110 determines that the image processing to be executed is not over.

When the image processing to be executed is not over (step S29: NO), the CPU 110 returns to step S22 and transmits the corresponding request to the target device. Then, the CPU 110 repeats the processing of steps S22 to S29. When the image processing to be executed is over (step S29: YES), the CPU 110 ends the device control processing.

FIG. 11 is a sequence diagram when the scanner 300A and the printer 200B are enabled to execute the copy processing by the device control processing. As can be seen from FIGS. 9 and 11, when the scanner 300A and the printer 200B are enabled to execute the copy processing, requests of two times (i.e., the operation confirmation and the scan request described above) are first transmitted to the scanner 300A (step S22). As a result, the portable terminal 100 can acquire the read image data (scan data) from the scanner 300A (step S24).

As described above, the operation confirmation is a request for confirming whether the scanner 300A is powered and is at an operable state, and a corresponding normal response is a response indicating that an operation is possible, for example. Also, a corresponding abnormal response is a response indicating that an operation is impossible due to a failure and the like As described above, the scan request is a request for requesting the execution of the reading processing. A corresponding normal response is a response including the read image data, for example. A corresponding abnormal response is a response indicating that the reading processing cannot be executed because there is a paper jam in the ADF or there is no document.

When the read image data is acquired from the scanner 300A, the target device is changed from the scanner 300A to the printer 200B in accordance with the operation flow information OF and requests of four times (i.e., an operation confirmation, an reception state confirmation, a printing request and a confirmation of printing completion) are transmitted to the printer 200B (step S22). As a result, the portable terminal 100 can enable the printer 200B to print an image indicated by the read image data.

The operation confirmation is a request for confirming whether the printer 200B is powered and is at an operable state, and a corresponding normal response is a response indicating that an operation is possible, for example. Also, a corresponding abnormal response is a response indicating that an operation is impossible due to a failure and the like.

The reception state confirmation is a request for confirming whether the printer 200B is at a state where it can receive print data, and a corresponding normal response is a response indicating that the reception is possible, for example. The print data is image data having the above-described various formats. Also, a corresponding abnormal response is a response indicating that the print data cannot be immediately received from the portable terminal 100 because the memory of the printer 200B is occupied by the print data already received from other computational devices and the like, for example.

The printing request is a request for requesting the printer 200B to execute the printing, and includes the print data. A normal response corresponding to the printing request is a response indicating that the reception of the print data is completed, for example. Also, a corresponding abnormal response is a response indicating that the reception of the print data fails because there is a communication failure or the printer 200B does not correspond to the format of the print data, for example.

The confirmation of printing completion is a request for confirming whether the printing to be executed in accordance with the printing request is normally completed in the printer 200B. A corresponding normal response is a response indicating that the printing is normally completed, for example. A corresponding abnormal response is a response indicating that the printing is interrupted due to consumption of a printing material such as toner and ink or paper jam (so-called out-of-toner, out-of-ink) or because the printer 200B does not correspond to the format of the print data, for example.

Whenever performing the transmission of the request and the reception of the response, error-related processing of determining whether an error occurs is performed (FIG. 11). Steps S30 to S36 of FIG. 8, which are described below, are the error-related processing.

When it is determined in step S24 that a response is not received from the target device (step S24: NO) and when it is determined in step S26 that the response from the target device is not a normal response (step S26: NO), it is thought that any error has occurred. That is, it can be said that the processing of steps S24 and S26 is processing of detecting whether an error has occurred in any one of the one set of devices executing the complex processing. Specifically, after the request is transmitted to the target device in step S22, when a response is not received from the target device even though the predetermined time period has elapsed (step S14: NO) and when an abnormal response is received from the target device (step S26: NO), the CPU 110 determines that an error has occurred in the target device. When an error is detected (step S24: NO or step S26: NO), the CPU 110 specifies the device in which the error has occurred (step S30). Specifically, the current target device is specified as a device in which the error has occurred.

In step S32, the CPU 110 specifies a content of the error. When the portable terminal 100 receives an abnormal response from the target device, i.e., a response including information indicating a content of the error, the content of the error is specified based on the information included in the response. When a response is not received (step S24: NO), the content of the error is specified based on the content of the request corresponding to the non-received response.

For example, when a response corresponding to the request of 'operation confirmation' to the scanner 300A or printer 200B is not received, a communication error such as the power-off of the printer 200B or a failure of the access point 50 or LAN 60 is determined.

Also, when the responses corresponding to the requests of 'operation confirmation' and 'reception state confirmation' to the printer 200B are normal but the response corresponding to the request of 'printing request' is not received, it is thought that a failure has not occurred in the access point 50 or LAN 60 and that the printer 200B is at a state where it can receive the print data. For this reason, in this case, it is thought that an error that the printer 200B cannot receive the print data because a size of the print data is excessively large or an error that the printer 200B cannot be made to correspond to the format of the print data has occurred. Also, when the response corresponding to the request of 'printing request' is normal but the response corresponding to the request of 'confirmation of printing completion' is not received, it is thought that the operation is suspended because the printer 200B succeeds in the reception of the print data but the format of the print data cannot be interpreted.

Like this, the reason to specify the content of the error based on the content of the response and to specify the content of the error on the basis that the response cannot be received is because it cannot be said that the function of specifying the contents of all errors and transmitting the response including the error information is necessarily provided, depending on the models of the devices in the system. For example, there may be a device that freezes and thus does not transmit any response because it cannot interpret the format of the print data or due to the overflow of the memory. Even in this case, according to this illustrative embodiment, the operation flow information OF is referred to, so that a response to any request can be received, and a content of an error is estimated on the basis whether a response to any request cannot be received, so that the content of the error can be specified.

Figure 10B:
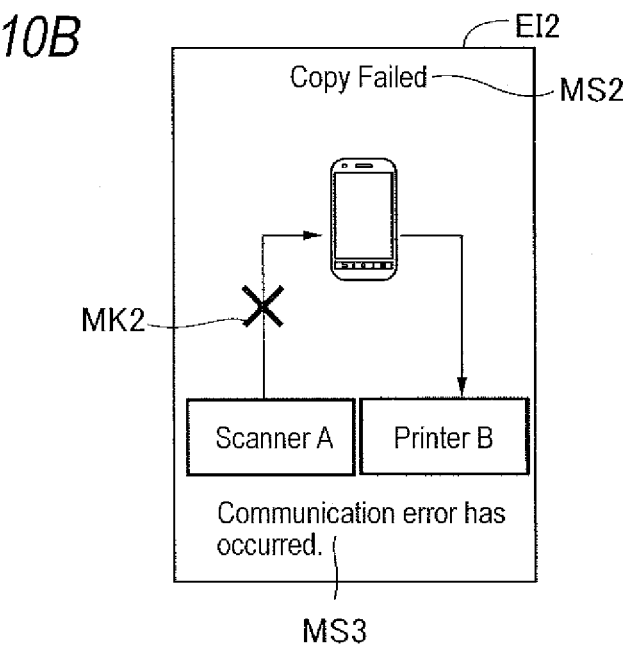

When the content of the error is specified, the CPU 110 displays the error information including information related to the specified content of the error on the display unit 180 in step S34. FIG. 10B shows an example of a progressing image EI2 in which the error information is displayed. In the progressing image EI2, a message MS2 indicating that an error has occurred and a message MS3 or mark MK2 indicating a content (cause) of an error are displayed as the error information.

In step S36, the CPU 110 updates the error occurrence information EI (FIG. 4), based on the content of the error having occurred. For example, when the error having occurred is an error related to the cooperation of the input device and the output device, such as the communication error that the data (for example, the read image data) output from the input device cannot be input to the output device, the CPU 110 associates the error information indicating the content of the error with the combination pattern of devices in which the error has occurred and adds the same to the error occurrence information EI. On the other hand, when the error having occurred is a temporary error such as the paper jam and the power-off or an error not related to the cooperation of the input device and the output device, the error information related to the error is not added to the error occurrence information EI. As a result, when the error related to the cooperation of the input device and the output device, such as the communication error, is detected, the error information indicating the one set of devices in which the error is detected is associated with the content of the error, which is then stored in the non-volatile storage device 130.

When the error occurrence information EI is updated, the CPU 110 ends the device control processing. In the meantime, since the processing of step S38 shown with the broken line is executed in a second illustrative embodiment, it will be described later.

According to the device control processing of this illustrative embodiment described above, while the complex processing (for example, the copy processing by the scanner 300A and the printer 200B) is being executed, it is determined whether an error has occurred in any of the one set of devices executing the complex processing (steps S24 and S26). When the error is detected, the error information including the information related to the content of the error is displayed on the display unit 180 (step S34, FIG. 10B). As a result, since the user can appropriately perceive the content of the error having occurred during the execution of the complex processing, it is possible to improve the convenience of the system 1000 for the user.

Also, when the error is detected, the error information indicating the one set of devices (the combination pattern of devices) in which the error is detected is added to the error occurrence information EI together with the information indicating the content of the error and is stored in the non-volatile storage device 130 (step S36). As a result, it is possible to use the error information of the information of the one set of devices in which the error is detected when determining the executable complex processing in the UI display processing that is executed next time (steps S15 and S16 of FIG. 5).

Therefore, since the UI display processing from next time is executed using the updated error occurrence information EI, it is possible to provide the user with the more appropriate error information. For example, even when the format of the image data output from the input device is matched with the format that can be input by the output device in the input/output information (FIG. 2), a case may occur in which the output device cannot actually receive the image data output from the input device. The cause may be a difference of versions of the formats, a difference of detailed specifications upon mounting, an affinity between the models, and the like. For this reason, it is possible to determine the combination pattern of the devices actually operating more precisely by accumulating the error having actually occurred as the error occurrence information EI.

B. Second Illustrative Embodiment

B-1. Configuration of System

Figure 12:
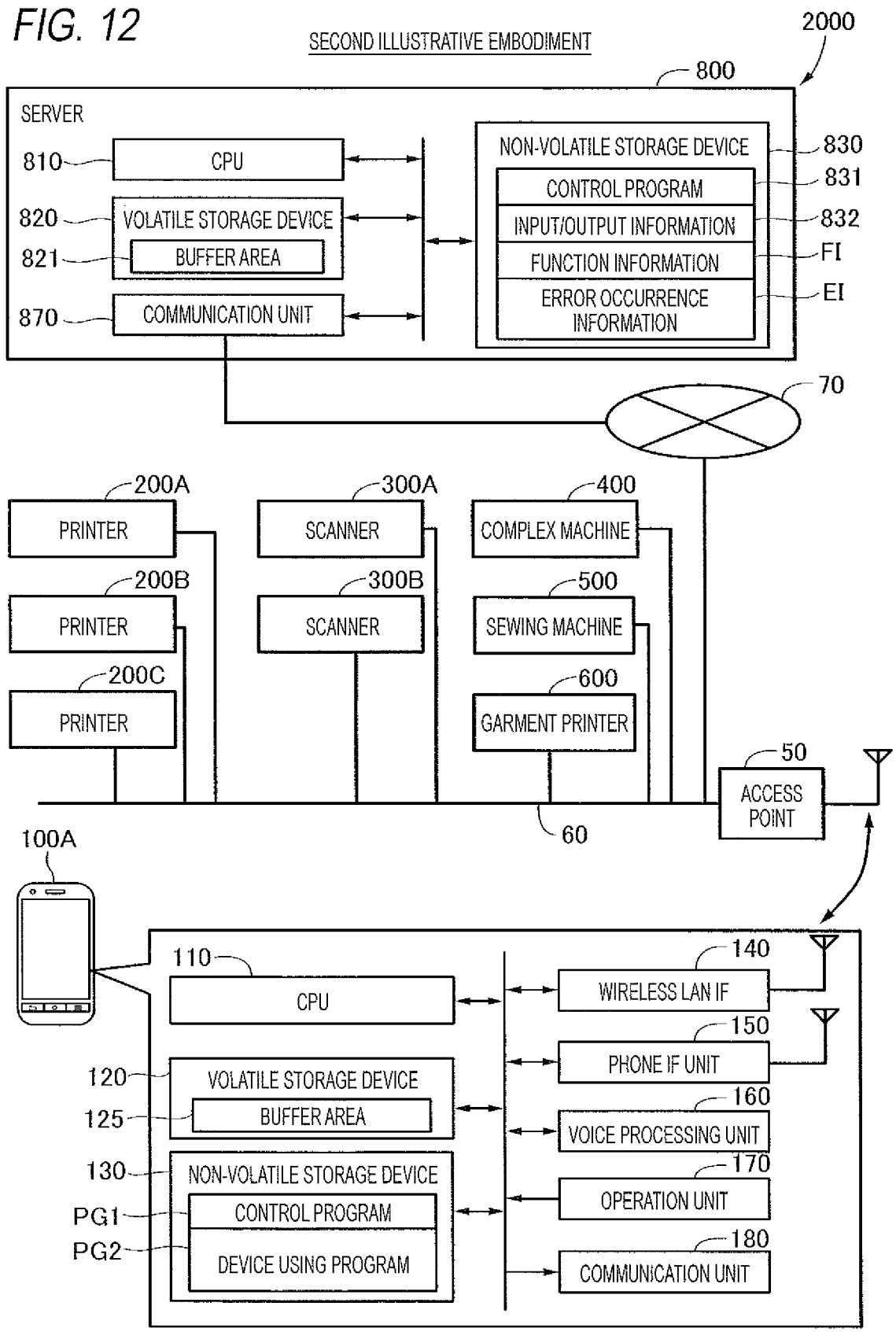
FIG. 12 is a block diagram showing a configuration of a system 2000 according to a second illustrative embodiment.

FIG. 12 is a block diagram showing a configuration of a system 2000 according to a second illustrative embodiment. The system 2000 has a server 800, in addition to the configuration included in the system 1000 of the first illustrative embodiment. The server 800 is connected to the Internet 70 and the LAN 60 is connected to the Internet 70. The portable terminal 100 recognizes an IP address of the server 800 and can perform communication with the server 800 through the access point 50, the LAN 60 and the Internet 70.

The server 800 has a volatile storage device 820 such as a RAM, a non-volatile storage device 830 such as a hard disk drive and a flash memory and a communication unit 870 including an interface for performing data communication with an external device.

The volatile storage device 820 is provided with a buffer area 821 in which a variety of intermediate data generated when a CPU 810 performs processing is temporarily stored. The non-volatile storage device 830 stores therein a control program 831 for implementing a function of the server, input/ output information 832 that will be described later, the function information FI (FIG. 3) and the error occurrence information EI (FIG. 4).

The eight devices 200A to 200C, 300A, 300B, 400, 500, 600 of the system 2000 have the basically same configurations as the devices having the same names of the system 1000. However, the respective devices of the system 2000 do not store therein the input/output information 232A to 232C, 332A, 332B, 432, 532, 632 (FIG. 2) thereof.

The input/output information 832 stored in the server 800 includes all the eight input/output information 232A to 232C, 332A, 332B, 432, 532, 632 of FIG. 2. In the input/output information 832, the eight input/output information 232A to 232C, 332A, 332B, 432, 532, 632 of FIG. 2 are associated with identifiers (specifically, the model IDs) indicating the corresponding devices (not shown). Furthermore, the input/output information 832 includes the input/output information 832S of the server 800. This is because the server 800 is also used as one device for executing the complex processing, in the second illustrative embodiment. Specifically, the server 800 can execute the two image processing of moiré removing processing and background removing processing, in addition to a function of the server of executing the control program 831 to transmit and receive data to and from the portable terminal 100. The moiré removing processing is processing of generating print data (for example, dot data) obtained by performing the well-known image processing of suppressing the moiré from being generated for the input image data (for example, the read image data generated by the scanner). The background removing processing is processing of generating print data (for example, dot data) obtained by performing the well-known image processing (processing of converting a background color into white) of removing a background color for the input image data (for example, the read image data generated by the scanner).

FIG. 13 shows the input/output information 832S of the server 800. The image processing that is executed by the server 800 is the 'moiré removing processing' and the 'background removing processing'. An input for the image processing is image data, and an output of a result of the image processing is processed image data. Therefore, as shown in FIG. 13, the input/output information 832 of the server 800 includes input information indicating a format of image data that can be input for the image processing and output information indicating a format of processed image data that is output as a result of the image processing. In the example of FIG. 13, the format of the image data that can be input includes the RGB image data, the dot data, the image data compressed with the JPEG, the image data described with the PostScript and the image data preserved with the PDF. Also, the format of the processed image data that is output as a result of the image processing is the dot data.

In the non-volatile storage device 130 of the portable terminal 100 of the system 2000, the function information FI and the error occurrence information EI are not stored. The information FI, EI is stored in the server 800, as described above, and the portable terminal 100 acquires the information FI, EI from the server 800, as required.

The function information FI stored in the server 800 includes a separate complex processing search table FIC in which a combination pattern of three devices including the server 800 functioning as a relay device and a type of a function of the complex processing that can be executed using the combination pattern of the three devices are associated with each other, in addition to the model search table FIA and the complex processing search table FIB of FIG. 4.

FIG. 14 shows an example of the complex processing search table FIC. In this example, the copy processing including the moiré removing processing and the copy processing including the background removing processing can be executed by the scanner functioning as the input device, the server functioning as the relay device and the printer functioning as the output device, as the combination pattern of the three devices.

Since the other configurations of the system 2000 are the same as the configurations of the system 1000 shown in FIG. 1, the descriptions thereof are omitted.

B-2. Operations of System

FIG. 15 is a flowchart of the UI display processing of the second illustrative embodiment. In step S10A, the CPU 110 of the portable terminal 100 searches the devices in the LAN 60 by inquiring of the server 800. Specifically, the server 800 transmits a response, which includes a list of the devices in the LAN 60 and the information (for example, an IP address or URL) for accessing each device, to the CPU 110, in response to the request from the CPU 110. The CPU 110 can recognize the devices in the LAN 60 by the information included in the response from the server 800. Instead of this configuration, in step S10A, the CPU 110 may search the devices in the LAN 60 by broadcasting a predetermined search packet on the LAN 60, like the step S11 of the first illustrative embodiment.

In step S11A, the CPU 110 further requests the server 800 to transmit the information about the searched device. Specifically, the CPU 110 transmits a request of the information to the server 800. The server 800 transmits a response, which includes the model IDs of the respective devices in the LAN 60, the input/output information 832 (FIGS. 2 and 13), the function information FI (FIGS. 3 and 14) and the error occurrence information EI (FIG. 4), to the CPU 110, in response to the request from the CPU 110. In step S12A, the CPU 110 acquires the information by the response from the server 800. Instead of this configuration, in step S11A, the CPU 110 may acquire a part of the information from the respective devices by inquiring of the respective searched devices. Specifically, the CPU 110 may acquire the model IDs of the respective devices from the respective devices and acquire the other information (the output information 832, the function information FI and the error occurrence information EI) from the server 800.

In step S14A, the CPU 110 generates combination information indicating the combination pattern of the devices including the server functioning as the relay device. Specifically, the combination information indicating a total of 112 combination patterns is generated which include 56 combination patterns in which the server functioning as the relay device is interposed between the respective pairs, in addition to the 56 combination patterns of the pairs of the input device and the output device in the first illustrative embodiment. In this example, the combination information is generated on the assumption that the server 800 cannot be the input device or output device and can be only the relay device.

Since the processing of steps S14 to S17 is the same as the processing of the steps having the same reference numerals in the UI display processing (FIG. 5) of the first illustrative embodiment, the descriptions thereof are omitted.

Subsequently, the device control processing of the second illustrative embodiment is described. The device control processing of the second illustrative embodiment is the same as the device control processing of the first illustrative embodiment described with reference to FIG. 8. However, the processing of step S38 shown with the broken line in FIG. 8 is added to the device control processing of the second illustrative embodiment.

The processing of step S38 is processing that is executed when the error occurrence information EI is updated in step S36. In step S38, the CPU 110 transmits the updated error occurrence information EI to the server 800. As a result, the error occurrence information EI, in which the error information indicating the one set of devices in which an error is detected is stored with being associated with the content of the error, is stored in the non-volatile storage device 830 of the server 800 (FIG. 12). As a result, in step S12A (FIG. 15) of the UI display processing that is executed next time, the portable terminal 100 can acquire the updated error occurrence information EI and use the same for the UI display processing.

FIG. 16 shows an example of operation flow information OF2 of the second illustrative embodiment. As described above, the complex processing can be executed using the combination pattern of the three devices, i.e., the input device, the relay device and the output device. In the example of FIG. 16, the operation flow information OF2 for executing the copy processing by the scanner 300A functioning as the input device, the server 800 functioning as the relay device and the printer 200A functioning as the output device is shown.

The operation flow information OF2 includes partial flow information PF3 for the server 800 functioning as the relay device, in addition to the partial flow information PF1 for the scanner 300A and the partial flow information PF2 for the printer 200B.

As can be seen from the operation flow information OF2, even when the number of the target devices is increased, the CPU 110 of the portable terminal 100 repeats the processing of transmitting a response to the target device and receiving a response from the target device in accordance with the operation flow information OF2, thereby executing the complex processing.

According to the second illustrative embodiment described above, the user can easily perceive the image processing that can be executed by the plurality of devices in the system, like the first illustrative embodiment.

Furthermore, according to the second illustrative embodiment, since the portable terminal 100 does not have to keep therein the function information FI and the error occurrence information EI all the time, it is possible to save the non-volatile storage device 130. Also, since the respective devices 200A to 200C, 300A, 300B, 400, 500, 600 do not have to keep therein the input/output information 232A to 232C, 332A, 332B, 432, 532, 632 (FIG. 2), it is possible to save the non-volatile storage device 230.

Further, according to the second illustrative embodiment, even when the respective devices 200A to 200C, 300A, 300B, 400, 500, 600 do not have the function of executing the image processing such as the 'moiré removing processing' and the 'background removing processing', it is possible to execute the complex processing such as the copy processing including the image processing.

As can be seen from the descriptions of the second illustrative embodiment, the combination pattern of the devices for executing the complex processing is not limited to the combination pattern of two devices and may be a combination pattern of three or more devices.

C. Third Illustrative Embodiment

In the first illustrative embodiment, the complex processing that can be executed using the combination pattern of devices is determined (FIG. 5: step S16), based on the function information FI (FIG. 3) in which the pair of the type (for example, the scanner) of the input device and the type (for example, the printer) of the output device is associated with the type (for example, the copy processing) of the function of the complex processing. Instead of this configuration, in a third illustrative embodiment, the complex processing that can be executed using the combination pattern of devices is determined, based on function information FID in which a form of an input for executing the image processing in the input device, a form of an output of a result of the image processing in the output device and the type of the function of the complex processing are associated. That is, the portable terminal 100 of the third illustrative embodiment stores therein the function information FID (FIG. 18), which will be described later, instead of the function information FI of FIG. 3 (the model search table FIA and the complex processing search table FIB).

FIG. 17 shows an example of the input/output information of the third illustrative embodiment. FIGS. 17A to 17D show the input/output information 232A, 232B, 332A, 332B of the printers 200A, 200B and the scanners 300A, 300B of the eight devices 200A to 200C, 300A, 300B, 400, 500, 600 of FIG. 1.

The input information of the input/output information 232A, 232B of the printers 200A, 200B shown in FIG. 17 is the same as the information having the same names of FIG. 2. However, the output information is different. That is, in the output information of the input/output information 232A, 232B of FIG. 17, types (forms of the output) of sheets that can be output as a result of the printing by the corresponding printers 200A, 200B are described. For example, as shown in the input/output information 232A, the printer 200A can execute the printing on an A3 sheet and an A4 sheet. Also, as shown in the input/output information 232B, the printer 200B can execute the printing on an A4 sheet.

The output information of the input/output information 332A, 332B of the scanners 300A, 300B shown in FIG. 17 is the same as the information having the same names of FIG. 2. However, the input information is different. That is, in the input information of the input/output information 332A, 332B of FIG. 17, types (forms of the input) of sheets that can be read by the corresponding scanners 300A, 300B are described. For example, as shown in the input/output information 332A, the scanner 300A can read A3 and A4 sheets and a card. Also, as shown in the input/output information 332B, the scanner 300B can read an A4 sheet and a card.

FIG. 18 shows an example of the function information FID of the third illustrative embodiment. In the function information FID of FIG. 18, a pair of a form of an input of the input device and a form of an output of the output device is stored with being associated with a type of the function of the complex processing that is executed by the pair of devices. For example, as shown in FIG. 18, a pair of an A3 sheet as a form of an input of the input device and an A3 sheet as a form of an output of the output device is associated with the copy processing of A3 as a type of the function of the complex processing. Also, a pair of a card as a form of an input of the input device and image data having a FAXG4 format as a form of an output of the output device is associated with the card fax processing as a type of the function of the complex processing.

In step S16 of the UI display processing of the third illustrative embodiment, the CPU 110 specifies a form of an input of the input device and a form of an output of the output device for each combination pattern of devices by referring to the input/output information (FIG. 17). The CPU 110 searches the function information FID by using the pair of a form of an input of the input device and a form of an output of the output device as a search key and determines a type of the function of the complex processing corresponding to the combination pattern of devices.

According to the third illustrative embodiment described above, it is possible to appropriately determine the executable image processing, based on a form of an input for image processing in the input device and a form of an output of a result of the image processing in the output device.

D. Modified Embodiments (1) In the first illustrative embodiment, the CPU 110 determines the combination pattern of devices by using the input/output information 232A to 232C, 332A, 332B, 432, 532, 632 of the respective devices. Instead of this configuration, for example, the CPU 110 may determine the combination pattern by using the function information FI (FIG. 3). In this case, for example, the CPU 110 specifies the types of the respective devices (scanner, printer and the like) by searching the model search table FIA included in the function information FI. Also, the combination pattern may be determined to configure the pair of the type of the input device and the type of the output device described in the complex processing search table FIB. Also, the CPU 110 may determine the combination pattern by using the function information FI and then confirm whether the format of the image data output from the input device configuring each combination pattern can be input by the output device by using the input/output information 232A to 232C, 332A, 332B, 432, 532, 632.

(2) In the above illustrative embodiments, the portable terminal 100 executes the UI display processing and the device control processing. However, instead of the portable terminal 100, another computational device may execute the corresponding processing. For example, a PC connected to the LAN 60 may execute the UI display processing and the device control processing.

(3) The functions of the server 800 of the second illustrative embodiment, specifically, the functions of storing the input/output information 832 of the respective devices, the function information FI and the error occurrence information EI and transmitting the same to the portable terminal 100 in response to the request from the portable terminal 100 may be executed by another device. For example, the information 832, FI, EI may be stored in the non-volatile storage device 230 of any one of the eight devices 200A to 200C, 300A, 300B, 400, 500, 600 connected to the LAN 60. In this case, the portable terminal 100 may acquire the information 832, FI, EI from the device storing therein the information 832, FI, EI. Also, the information 832, FI, EI may be beforehand stored in the non-volatile memory device 130 of the portable terminal 100.

(4) In the first illustrative embodiment, the image data (for example, the read image data generated by the scanner), which is output as a result of the image processing executed by the input device, is transmitted to the portable terminal 100. Then, the image data is transmitted from the portable terminal 100 to the output device. Instead of this configuration, the image data, which is output as a result of the image processing executed by the input device, may be directly transmitted from the input device to the output device. In this case, for example, when the portable terminal 100 transmits a request for instructing the input device to execute the image processing, information for designating a device to which the output image data should be transmitted may be included in the request.

(5) In the first illustrative embodiment, the communications between the portable terminal 100 and the eight devices 200A to 200C, 300A, 300B, 400, 500, 600 are performed using the wireless communication (wireless communication in an infrastructure mode) through the access point 50. Instead of this configuration, a part or all of the communications may be performed using other various communication methods, for example, an ad-hoc mode of a wireless LAN, Wi-Fi direct, Bluetooth (registered trademark), infrared communication and the like.

(6) The device (the image processing apparatus) adopted in the first illustrative embodiment is exemplary and other types of devices may be adopted. For example, a digital camera, a facsimile, a display, a projector and the like may be adopted.

(7) In the first illustrative embodiment, the portable terminal 100 executes both the UI display processing and the device control processing. However, the portable terminal 100 may execute only the UI display processing and may just provide a user with the support information such as a type of the image processing that can be executed by a plurality of devices. A user may operate a device to execute the actual image processing, and another computational device (for example, a PC) connected to the LAN 60 may execute the device control processing, based on a user's instruction.

(8) In the third illustrative embodiment, the function information FID in which the form (specifically, a size of a sheet) of the input for executing the image processing in the input device, the form (specifically, a size of a sheet) of the output of a result of the image processing in the output device and the type of the function of the complex processing are associated is adopted. The invention is not limited thereto. For example, the complex processing that can be executed using the combination pattern of devices may be determined based on the function information FID in which a variety of forms of the input for executing the image processing in the input device and a variety of forms of the output of a result of the image processing in the output device are associated. For example, the forms of the input/output may be a relatively wide concept such as 'sheet', 'cloth', 'image data' and the like or may be a relatively narrow concept such as 'postcard', 'T-shirt', 'PEG image data' and the like.

(9) In the respective illustrative embodiments, a part of the configuration executed by the hardware may be replaced with software. To the contrary, a part of the configuration executed by the software may be replaced with the hardware.

(10) When a part or all of the functions of the present invention is executed by the software, the corresponding software (computer program) may be provided with being stored in a computer-readable recording medium. The computer-readable recording medium is not limited to a portable recording medium such as a memory card and a CD-ROM, and includes an internal storage device in a computer, such as a variety of RAMs and ROMs, and an external storage device connected to the computer, such as a hard disk drive.

Although the present invention has been described with reference to the illustrative embodiments and the modified embodiments, the illustrative embodiments are provided just to easily understand the present invention, not to limit the present invention. The present invention can be changed and improved without departing from the gist thereof and the claims and includes the equivalents thereto.

The present invention includes illustrative, non-limiting examples as follows:

(1) A non-transitory computer-readable storage medium having a computer program stored thereon and readable by a computer of a communication apparatus connected to a network including a plurality of image processing apparatuses, the computer program, when executed by the computer, causing the communication apparatus to perform operations including: searching the plurality of image processing apparatuses in the network; obtaining processing information being related to execution of image processing configured to be executed by each of the plurality of image processing apparatuses and is prepared for each of the plurality of image processing apparatuses; determining a plurality of executable image processing, which can be executed by the plurality of searched image processing apparatuses, by using processing information, the plurality of executable image processing including complex processing that is configured to be executed by a first image processing apparatus configured to execute first image processing and a second image processing apparatus configured to execute second image processing by using data obtained by executing the first image processing, and displaying support information, which is for selecting an image processing from the plurality of executable image processing, on a display unit of the communication apparatus.

According thereto, the support information for selecting the image processing including the complex processing, which is executed by the first image processing apparatus and the second image processing apparatus, in accordance with the plurality of image processing apparatuses in the network is displayed on the display unit. Therefore, a user can appropriately perceive the image processing that can be executed by the plurality of image processing apparatuses in the network.

(2) The storage medium according to (1), wherein the processing information includes: information indicating a format of output data, the output data being configured to be output from the first image processing apparatus by executing the image processing by the first image processing apparatus, and information indicating a format of input data, the input data being able to be input to the second image processing apparatus to execute the image processing by the second image processing apparatus, and wherein the determining of the plurality of executable image processing determines, by referring to the processing information, that the complex processing configured to be executed by the first image processing apparatus and the second image processing apparatus is the executable image processing when the processing information indicates that the data configured to be output from the first image processing apparatus can be input to the second image processing apparatus.

According thereto, it is possible to appropriately determine the executable image processing, based on the format of the data configured to be output from the first image processing apparatus and the format of the data that can be input to the second image processing apparatus.

(3) The storage medium according to (1) or (2), wherein the determining of the plurality of executable image processing determines the executable image processing based on information in which a form of an input for the first image processing, a form of an output of a result of the second image processing and a type of a function of the complex processing are associated.

According thereto, it is possible to appropriately determine the executable image processing, based on the type of the first image processing apparatus and the type of the second image processing apparatus.

(4) The storage medium according to (1) or (2), wherein the determining of the plurality of executable image processing determines the executable image processing based on information in which a type of the first image processing apparatus, a type of the second image processing apparatus and a type of a function of the complex processing are associated.

According thereto, it is possible to appropriately determine the executable image processing, based on the type of the first image processing apparatus and the type of the second image processing apparatus.

(5) The storage medium according to one of (1) to (4), wherein the second image processing apparatus is an apparatus different from the first image processing apparatus, wherein the operations further include: detecting, during execution of the complex processing, whether an error has occurred in any one of a set of image processing apparatuses by which the complex processing is executed, and wherein the displaying further displays, when the error is detected, first error information including information related to a content of the error on the display unit.

According thereto, since it is possible to display the error information generated during the execution of the complex processing, it is possible to improve the convenience for a user.

(6) The storage medium according to one of (1) to (4), wherein the second image processing apparatus is an apparatus different from the first image processing apparatus, wherein the operations further include: detecting, during execution of the complex processing, whether an error has occurred in any one of a set of image processing apparatuses by which the complex processing is executed, and storing, in a case that the error is detected, second error information indicating the set of image processing apparatuses from which the error is detected in a storage device.

According thereto, since it is possible to store the second error information indicating the set of image processing apparatuses from which the error is detected in the storage device, it is possible to use the corresponding error information when determining the executable complex processing later.

(7) The storage medium according to (6), wherein the operations further include: acquiring the second error information stored in the storage device, and wherein the displaying displays the support information for selecting the image processing from the plurality of executable image processing not including the complex processing which is configured to be executed by the set of image processing apparatuses corresponding to the second error information.

According thereto, it is possible to suppress a user from selecting the complex processing in which an error may occur.

(8) The storage medium according to (6), wherein the operations further include: acquiring the second error information stored in the storage device, and wherein the displaying displays the support information including error-related information in a case that the support information for selecting the complex processing, which is executed by a combination of the first image processing apparatus and the second image processing apparatus corresponding to the second error information, is displayed.

According thereto, it is possible to suppress a user from selecting the complex processing in which an error may occur.

(9) The storage medium according to one of (6) to (8), wherein the second error information includes information related to a mismatch between an ability of the first image processing apparatus and an ability of the second image processing apparatus.

When there is a mismatch between the ability of the first image processing apparatus and the ability of the second image processing apparatus, a problem such as deterioration of an image quality may occur in the complex processing that is executed by the first image processing apparatus and the second image processing apparatus. However, according to the above configuration, it is possible to suppress a user from selecting the complex processing in which the problem may occur.

(10) A communication apparatus connected to a network including a plurality of image processing apparatuses, the communication apparatus including: a processor; and a memory storing instructions that, when executed by the processor, cause the communication apparatus to perform: searching the plurality of image processing apparatuses in the network; obtaining processing information being related to execution of image processing configured to be executed by each of the plurality of image processing apparatuses and is prepared for each of the plurality of image processing apparatuses, determining a plurality of executable image processing, which can be executed by the plurality of searched image processing apparatuses, by using processing information, the plurality of executable image processing including complex processing that is configured to be executed by a first image processing apparatus configured to execute first image processing and a second image processing apparatus configured to execute second image processing by using data obtained by executing the first image processing, and displaying support information, which is for selecting an image processing from the plurality of executable image processing, on a display unit of the communication apparatus.

What is claimed is:

1. A non-transitory computer-readable storage medium having a computer program stored thereon and readable by a computer of a communication apparatus connected to a network including a plurality of image processing apparatuses, the computer program, when executed by the computer, causing the communication apparatus to perform operations comprising:

searching the plurality of image processing apparatuses in the network;

obtaining processing information being related to execution of image processing configured to be executed by each of the plurality of image processing apparatuses and is prepared for each of the plurality of image processing apparatuses;

determining a plurality of executable image processing, which can be executed by the plurality of searched image processing apparatuses, by using the processing information, the plurality of executable image processing including complex processing that is configured to be executed by a first image processing apparatus configured to execute first image processing and a second image processing apparatus configured to execute second image processing by using data obtained by executing the first image processing; and displaying first support information, which is for selecting an image processing from the plurality of executable image processing, on a display unit of the communication apparatus, the first support information being a first list showing information indicating a name of each of a plurality of image processing including the complex processing which can be executed within the network displaying, when an image processing is selected from the first list, second support information, which is for selecting one or more image processing apparatuses which can execute the selected image processing, on a display unit of the communication apparatus, the second support information being a second list showing information indicating names of the plurality of image processing apparatuses; and transmitting, when the one or more image processing apparatuses are selected from the second list, a request for executing the selected image processing to the selected image processing apparatus.

2. The storage medium according to claim 1, wherein the processing information includes:

information indicating a format of output data, the output data being configured to be output from the first image processing apparatus by executing the image processing by the first image processing apparatus, and information indicating a format of input data, the input data being able to be input to the second image processing apparatus to execute the image processing by the second image processing apparatus, and wherein the determining of the plurality of executable image processing determines, by referring to the processing information, that the complex processing configured to be executed by the first image processing apparatus and the second image processing apparatus is the executable image processing when the processing information indicates that the data configured to be output from the first image processing apparatus can be input to the second image processing apparatus.

3. The storage medium according to claim 1, wherein the determining of the plurality of executable image processing determines the executable image processing based on information in which a form of an input for the first image processing, a form of an output of a result of the second image processing and a type of a function of the complex processing are associated.

4. The storage medium according to claim 1, wherein the determining of the plurality of executable image processing determines the executable image processing based on information in which a type of the first image processing apparatus, a type of the second image processing apparatus and a type of a function of the complex processing are associated.

5. The storage medium according to claim 1, wherein the second image processing apparatus is an apparatus different from the first image processing apparatus, wherein the operations further comprise:

detecting, during execution of the complex processing, whether an error has occurred in any one of a set of image processing apparatuses by which the complex processing is executed, and wherein the displaying of the second support information further displays, when the error is detected, first error information including information related to a content of the error on the display unit.

6. The storage medium according to claim 1, wherein the second image processing apparatus is an apparatus different from the first image processing apparatus, wherein the operations further comprise:

detecting, during execution of the complex processing, whether an error has occurred in any one of a set of image processing apparatuses by which the complex processing is executed, and storing, in a case that the error is detected, second error information indicating the set of image processing apparatuses from which the error is detected in a storage device.

7. The storage medium according to claim 6, wherein the operations further comprise:

acquiring the second error information stored in the storage device, and wherein the second support information does not include information indicating names of the set of image processing apparatuses corresponding to the second error information.

8. The storage medium according to claim 6, wherein the operations further comprise:
acquiring the second error information stored in the storage device, and
wherein the displaying displays the second support information including error-related information in a case that the second support information, which includes information indicating names of the set of image processing apparatuses corresponding to the second error information, is displayed.

9. The storage medium according to claim 6, wherein the second error information includes information related to a mismatch between an ability of the first image processing apparatus and an ability of the second image processing apparatus.

10. A communication apparatus connected to a network including a plurality of image processing apparatuses, the communication apparatus comprising:
a processor; and
a memory storing instructions that, when executed by the processor, cause the communication apparatus to perform:
searching the plurality of image processing apparatuses in the network;
obtaining processing information being related to execution of image processing configured to be executed by each of the plurality of image processing apparatuses and is prepared for each of the plurality of image processing apparatuses,
determining a plurality of executable image processing, which can be executed by the plurality of searched image processing apparatuses, by using the processing information, the plurality of executable image processing including complex processing that is configured to be executed by a first image processing apparatus configured to execute first image processing and a second image processing apparatus configured to execute second image processing by using data obtained by executing the first image processing,
displaying first support information, which is for selecting an image processing from the plurality of executable image processing, on a display unit of the communication apparatus, the first support information being a first list showing information indicating a name of each of a plurality of image processing including the complex processing which can be executed within the network;
displaying, when an image processing is selected from the first list, second support information, which is for selecting one or more image processing apparatuses which can execute the selected image processing, on a display unit of the communication apparatus, the second support information being a second list showing information indicating names of the plurality of image processing apparatuses; and
transmitting, when the one or more image processing apparatuses are selected from the second list, a request for executing the selected image processing to the selected image processing apparatus.

\* \* \* \* \*